United States Patent
McNamara et al.

(10) Patent No.: US 10,410,170 B1
(45) Date of Patent: Sep. 10, 2019

(54) PROPAGATING AND EXPIRING PRESENTATION INFORMATION

(71) Applicant: Amazon Technologies, Inc., Reno, NV (US)

(72) Inventors: Alexander Michael McNamara, Seattle, WA (US); Korwin Jon Smith, Seattle, WA (US); Benjamin Ralph Hollis, Seattle, WA (US); Sridhar Boyapati, Sammamish, WA (US); Felix Joseph Etienne Pageau, Seattle, WA (US); Natalie Thuy-Tien Nguyen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1028 days.

(21) Appl. No.: 14/308,269

(22) Filed: Jun. 18, 2014

(51) Int. Cl.
*G06Q 10/08* (2012.01)

(52) U.S. Cl.
CPC ................... *G06Q 10/087* (2013.01)

(58) Field of Classification Search
CPC ............ G06Q 10/087; G06Q 10/0875; G06Q 30/0601; G06Q 10/083
USPC ..... 705/28, 26.1, 22; 700/213, 225; 235/385
See application file for complete search history.

(56) References Cited

U.S. PATENT DOCUMENTS

| | | | | |
|---|---|---|---|---|
| 4,965,825 A | * | 10/1990 | Harvey | G01R 1/071 380/233 |
| 5,625,816 A | * | 4/1997 | Burdick | G06F 17/30179 |
| 5,964,841 A | | 10/1999 | Rekhter | |
| 6,762,681 B1 | | 7/2004 | Danelski | |
| 7,225,980 B2 | | 6/2007 | Ku et al. | |
| 7,349,967 B2 | * | 3/2008 | Wang | G06F 3/0481 375/E7.019 |
| 7,949,568 B2 | | 5/2011 | Fano et al. | |
| 8,009,864 B2 | | 8/2011 | Linaker et al. | |
| 8,167,723 B1 | | 5/2012 | Hill et al. | |
| 8,175,925 B1 | | 5/2012 | Rouaix | |
| 8,189,855 B2 | | 5/2012 | Opalach et al. | |
| 8,423,431 B1 | | 4/2013 | Rouaix et al. | |
| 8,463,665 B1 | * | 6/2013 | Pape | G06Q 10/087 705/28 |
| 8,630,924 B2 | | 1/2014 | Groenevelt et al. | |
| 8,688,598 B1 | | 4/2014 | Shakes et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Vanel Frenel
(74) *Attorney, Agent, or Firm* — Athorus, PLLC

(57) ABSTRACT

Described is a system and method for propagating, synchronizing and expiring user specific information among multiple output devices. In some implementations, retention information is provided along with the user specific information and the output device and/or output device controller will determine when to expire the user specific information based on the retention information. In other implementations, the output device controller and/or output device may periodically request updates from other output devices, output device controllers and/or the inventory management system to determine whether to expire user specific information.

20 Claims, 15 Drawing Sheets

(56) References Cited

U.S. PATENT DOCUMENTS

| | | | |
|---|---|---|---|
| 9,442,934 B2* | 9/2016 | Matoba | G06F 17/30041 |
| 9,473,747 B2 | 10/2016 | Kobres et al. | |
| 2002/0010519 A1 | 1/2002 | Watanabe et al. | |
| 2002/0055893 A1* | 5/2002 | Mizumachi | G06Q 10/087 |
| | | | 705/29 |
| 2003/0002712 A1 | 1/2003 | Steenburgh et al. | |
| 2004/0008155 A1 | 1/2004 | Cok | |
| 2004/0093268 A1 | 5/2004 | Ramchandani et al. | |
| 2004/0181467 A1 | 9/2004 | Raiyani et al. | |
| 2005/0071842 A1 | 3/2005 | Shastry | |
| 2005/0091126 A1* | 4/2005 | Junger | G06Q 10/083 |
| | | | 705/22 |
| 2006/0058915 A1 | 3/2006 | Sheehan et al. | |
| 2006/0109113 A1 | 5/2006 | Reyes et al. | |
| 2007/0206547 A1 | 9/2007 | Gong et al. | |
| 2007/0273507 A1 | 11/2007 | Burchell et al. | |
| 2008/0055087 A1 | 3/2008 | Horii et al. | |
| 2008/0065235 A1 | 3/2008 | Igoe et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2010/0017711 A1* | 1/2010 | Aso | G06F 3/0238 |
| | | | 715/708 |
| 2010/0100822 A1 | 4/2010 | Aaron et al. | |
| 2010/0121480 A1 | 5/2010 | Stelzer et al. | |
| 2011/0011936 A1 | 1/2011 | Morandi et al. | |
| 2012/0072626 A1 | 3/2012 | Scott et al. | |
| 2012/0120871 A1 | 5/2012 | Jaeger | |
| 2012/0120954 A1 | 5/2012 | Mentze et al. | |
| 2012/0232689 A1 | 9/2012 | Buchmann et al. | |
| 2012/0284132 A1 | 11/2012 | Kim et al. | |
| 2013/0073666 A1* | 3/2013 | Matoba | G06F 17/30041 |
| | | | 709/213 |
| 2013/0076898 A1 | 3/2013 | Philippe et al. | |
| 2013/0100852 A1 | 4/2013 | Jeon et al. | |
| 2013/0154809 A1 | 6/2013 | Subramanian et al. | |
| 2013/0169817 A1 | 7/2013 | Jones et al. | |
| 2013/0211977 A1 | 8/2013 | Lyon et al. | |
| 2013/0253700 A1 | 9/2013 | Carson et al. | |
| 2013/0268401 A1* | 10/2013 | Choi | G06Q 30/0633 |
| | | | 705/26.8 |
| 2013/0338819 A1 | 12/2013 | Max | |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

PROPAGATING AND EXPIRING PRESENTATION INFORMATION

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
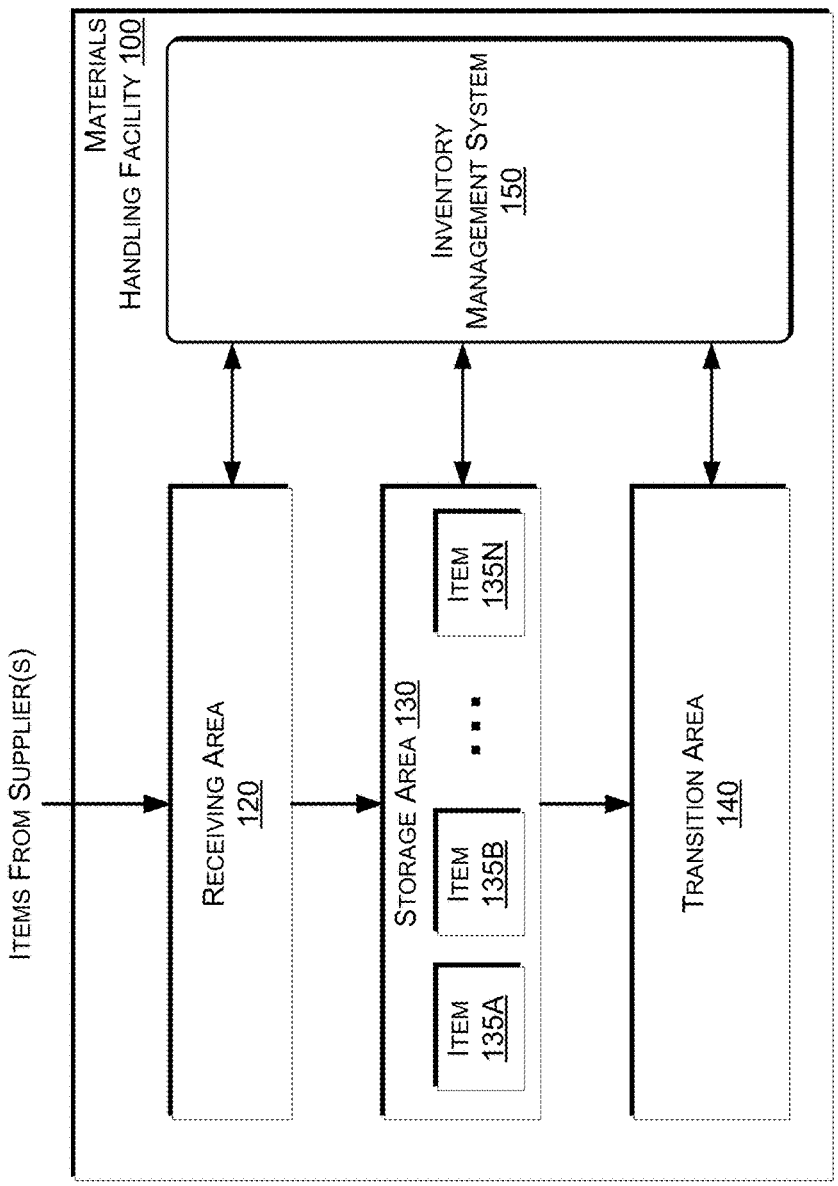
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for presenting user specific information to a user via multiple displays, transitioning that information between displays as the user moves through a materials handling facility and expiring the information from the display and memory. In one implementation, a location of a user in the materials handling facility is determined, user specific information identified and the user specific information provided to output device controllers that control the presentation of content on displays that are located near the user. In addition to providing the user specific information to the output device controller(s), control instructions may be provided that instruct the output device controller to pre-cache or otherwise store the user specific information, render the user specific information (e.g., on a virtual display) or present the user specific information on a display. Likewise, retention information may also be provided to the output device controller. The retention information specify how and/or when to remove or invalidate information from memory.

By proactively providing the user specific information to output device controllers and instructing the output device controllers to pre-cache, render and/or present the user specific information, the user specific information is available and can be quickly presented to the user if desired. In implementations where there are multiple displays adjacent to one another, user specific information, control instructions and retention information may be provided to each respective output device controller (an output device controller may control more than one display) and different control instructions and/or retention information may be provided for each display. For example, the user specific information may be provided to three different output device controllers, each output device controller controlling one or more displays. Likewise, control instructions may be provided to each output device controller instructing the output device controller to perform one or more actions with respect to the provided user specific information. For example, the output device controller that controls the display closest to the user may receive instructions to render and present the user specific information on the display. The output device controller controlling the display adjacent to the display that is presenting the user specific information may receive control instructions to pre-cache and render the user specific information, but not present it. Likewise, the third output device controller may receive control instructions to pre-cache the user specific information. In this manner, as the user moves locations between the displays, the user specific information can be quickly and seamlessly presented and transitioned among multiple displays. For example, if the user begins moving, instructions may be sent to the second output device controller instructing the second output device controller to present the user specific information on the second display. Likewise, instructions may be sent to the first output device controller to stop presenting the user specific information but keep it rendered and available, and instructions may be sent to the third output device controller to render the pre-cached user specific information.

Likewise, retention information may be sent to the output device controllers. The retention information may provide instructions for removing or deleting (generally referred to herein as "expiring") the content from memory of the output device controller. For example, the retention information may specify a time to live ("TTL"), such as 30 seconds, for the user specific information. The TTL is also referred to herein as a delay timer. The output device controller may use the TTL to determine when to expire the user specific information.

As discussed in more detail below, some materials handling facilities may include numerous (e.g., hundreds or thousands) of displays or other output devices and likewise may have numerous users located within the materials handling facility at any time. The systems described herein can monitor the location of each user within the materials handling facility and provide user specific information, specific to each user, to output device controllers controlling displays near those users, along with control instructions identifying actions to be performed with respect to the provided user specific information. In many instances, the user specific information will not be presented to the user and the user may move into other areas of the materials handling facility. As the user moves, additional output device controllers will be provided the user specific information along with control instructions associated with the user specific information. Likewise, the output device controllers may expire information based on received retention information. This process of providing, updating and expiring user specific information at various different output device controllers within the materials handling facility provides the ability to effectively deliver and present user specific information to a user when it is desired by the user without the delay of having to transmit and render the information before it can be presented.

While the above example discusses the use of displays and output device controllers, in other implementations the user specific information may be provided to and/or presented by other output devices. For example, rather than a display, the user specific information may be projected onto a surface for presentation to a user, presented audibly, presented on a portable device of the user, etc. Accordingly, an "output device" as used herein represents any form of output device that may be used to present information to a user. For example, the output device may be a display (e.g., LCD, plasma, LED), projector, speaker, and the like. In each instance, the output device may be controlled by and/or include an output device controller, such as an output device controller. User specific information may be provided to the output device controller and the output device controller may store, expire, render or present the user specific information. In some implementations, the output device controller may control multiple output devices.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Figure 2:
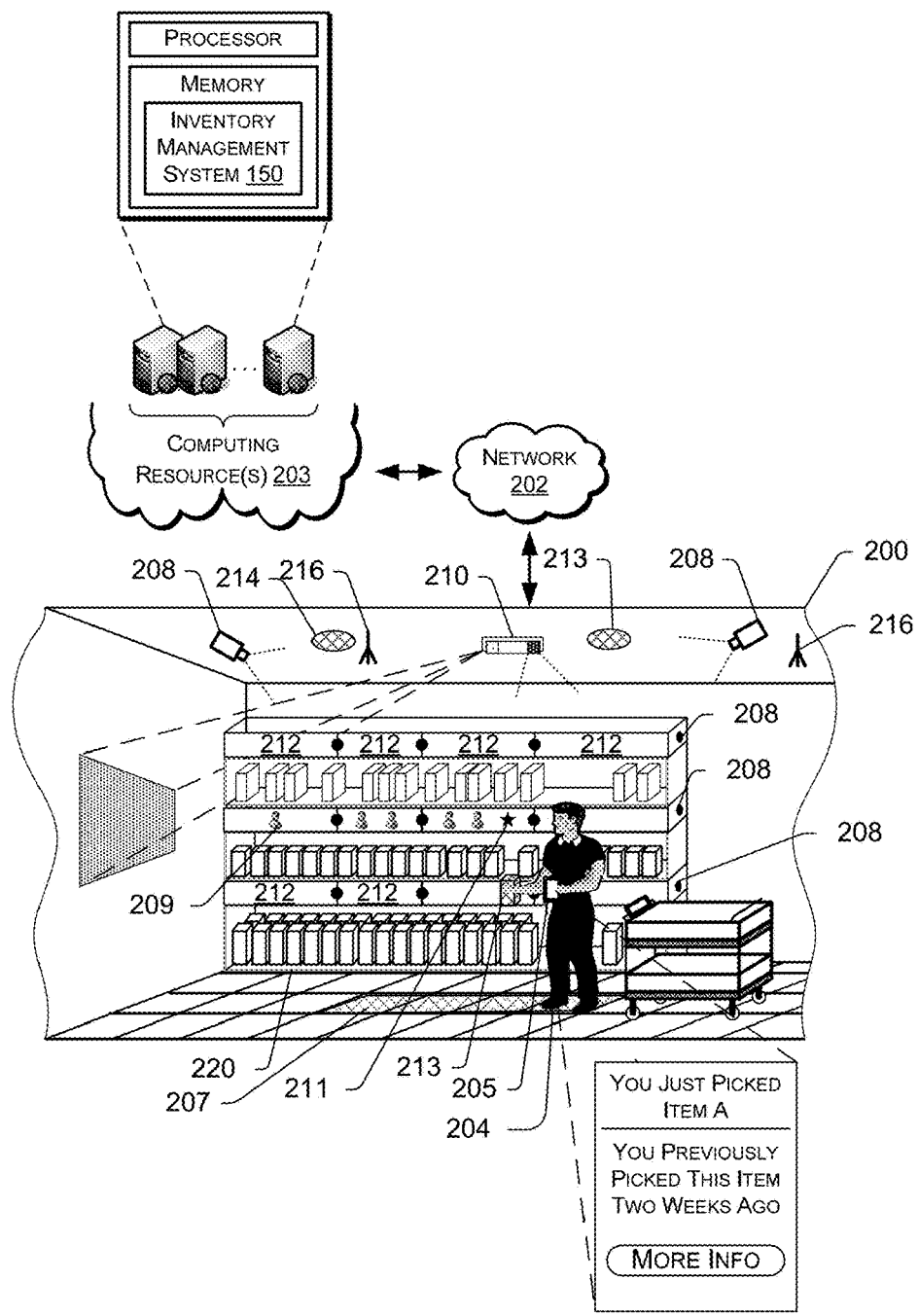
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, a scale, a light curtain, etc., may be utilized with the implementations described herein. For example, a pressure sensor and/or a scale may be used to detect when an item is added and/or removed from inventory locations.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than, or in addition to, processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204, any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202.

The following is an example use case for propagating and displaying user specific information on displays 212 based on the movement of the user within the materials handling facility 200. As used herein, user specific information may be any information that includes, at least partially, information that is selected based on the user and/or the location of the user within the materials handling facility. For example, user specific information may include a pick list of items to be picked by the user, recommended items, suggested items, items that pair well with picked items, an identification of items in the user's tote, information about items near the location of the user, information about an item picked by the user, etc.

When a user enters the materials handling facility, the inventory management system 150 may identify the user 204 (e.g., facial recognition, user ID card, user provided information, biometrics). Upon identifying the user 204, a user profile may be retrieved from a user data store. The user profile may include, among other information, item pick history, item view history, purchase history, associations with other users, etc.

The location of the user within the materials handling facility may also be determined. In some implementations, the orientation, direction and/or speed of the user's movement through the materials handling facility may also be determined. Based on the location of the user, one or more displays 212 are determined that are near the user and user specific information is provided to the output device controller(s) that are configured to control the determined displays. In some implementations, the number and/or selection of displays for which user specific information is provided may be determined based on the user, the location of the user within the materials handling facility, the orientation of the user, the direction in which the user is moving and/or the speed at which the user is moving.

For example, if the user is moving west through the materials handling facility down an aisle between two sets of shelves 220 at approximately four miles per hour and is on the right side of an aisle, the inventory management system 150 may select a display on the north shelf that is closest to the user, referred to as display 0, five displays on the north shelf that are west of display 0, referred to as display 1, 2, 3, 4, 5 and two displays on the north shelf east of display 0, referred to as display A and display B.

For the selected displays, the user specific information may be provided to the respective output device controllers along with control instructions identifying the action(s) to be performed with respect to the user specific information and retention information specifying how long the information is to be retained. For example, the control instructions for the output device controller configured to control display 0 may instruct the output device controller to render and display on display 0 the user specific information. The control instructions for display 1, display 2, display 3, display A, and display B may include instructions to render but not display the user specific information. For example, display 1, display 2, display 3, display A and display B may render the user specific information so that if it is requested it can be quickly presented on a display. Likewise, display 4 and display 5 may receive control instructions to pre-cache or otherwise store the user specific information but not render it. Likewise, the retention information may specify a 30 second TTL for retaining the user specific information.

As the user moves through the materials handling facility, additional control instructions, retention information and/or updated user specific information may be provided to one or more of the output device controllers. For example, if the user continues moving to the west, control instructions may be presented to the output device controllers that control display 4 and display 5 to render the stored user specific information. Display 0 may receive control instructions to stop presenting the user specific information but to keep it rendered. Likewise, the user specific information may be provided to additional output device controllers configured to control displays farther west (e.g., display 10 and display 7) along with control instructions identifying the actions to be performed by the output device controllers with respect to the user specific information.

The retention information may be utilized to efficiently expire the user information from memory of the output device controllers. For example, the control instructions may include a TTL of 30 seconds. When the 30 seconds have expired, if the user specific information is not being displayed, it may be expired. In some implementations, expiring the information may include deleting the information from memory, flagging the information as out of date or retaining the information unless memory space is needed to store additional user specific information (for the same and/or different users). In some implementations, the inventory management system, another output device controller and/or another output device may provide retention information updates. For example, if an output device is presenting information to a user located near the output device, that output device may provide retention update instructions to neighbor devices to reset the TTL and not expire the user specific information. In another example, the retention information update may be an instruction to expire the user specific information. For example, if it is determined that the user specific information is invalid or out of date, the inventory management system 150 may send a retention information update that instructs the output device controller to expire the previously received and stored user specific information.

This process of providing user specific information, control instructions and retention information may continue as the user moves throughout the materials handling facility so that the user specific information can be quickly presented to the user if desired. In some instances, many of the output device controllers may never actually present the user specific information. For example, control instructions to present the user specific information may only be provided if the user stops and/or looks toward a display. In other implementations, initial user specific information, such as a user identifier, path identifier, etc., may be presented on the displays or other output devices to assist in guiding the user through the materials handling facility. If the user looks at a display, the initial user specific information may be supplemented to present additional user specific information to the user. For example, in addition to presenting a user identifier, the additional user specific information may identify items at or near the display that are to be picked by the user.

In some implementations, the user specific information may include one or more animations that are specific to the user. For example, a user identifier 209 or user path identifier may be presented on the displays in an animated manner that assists in routing the user along a path through the materials handling facility. In some implementations, a user path 207 may exist that the user is to follow through the materials handling facility that passes the user by the location of each item to be picked by the user. The user path 207 may be presented to the user in the form of animations on the display and/or other output device. Utilizing the implementations discussed herein, the animations can transition between displays without visual disruptions to the user. For example, a speed of the user may be determined and used for determining the speed at which an animation for the user is to progress along the displays. An output delay timer may also be established to account for differences in processing speeds, network latency, etc., between output device controllers. As the animation speed and output delay timer progress, the presentation of the animation may finish on one display and begin on an adjacent display. In some implementations, there may be a separation between displays, such as an aisle between the displays, etc. In such an implementation, the output delay timer may be adjusted to account for the amount of time it will take the user to move across the separation from one display to another.

In some implementations, if the content is changing over time (such as an animation), variations may be determined and only the difference between variations may be propagated, thereby reducing network usage. For example, if the user specific information is a representation of a person walking, there may be an initial state that is propagated to output device controllers. To generate the animation, the user specific information may have multiple states that are presented to illustrate the animation. Rather than providing a full representation of the user specific information for each state, a difference between the initial state and each additional state may be determined and only the differences provided to the output device controllers. When the output device controller receives an instruction to present the animation in one of the states, it combines the initial state and the difference determined for the state to be presented.

Returning to FIG. 2, the user specific information may include information that is unique to the user to assist the user in identifying the user path associated with the user. For example, the visual identifier 209 may be unique to the user. The visual identifier may be selected and/or provided by the user, or assigned to the user by the inventory management system 150. If there are multiple users in the same area of the materials handling facility, the appropriate user identifier may be detected by each user so that the user can identify the appropriate user path.

As the user moves around the materials handling facility, the inventory management system 150 may assist the user in identifying items and/or discovering information about items by processing images collected by input/output components 208-216 positioned around the materials handling facility and providing or updating user specific information based on the processed images. For example, when the user reaches a location in the materials handling facility 200 that includes an item that is to be picked by the user, a visual identifier may be presented at, on or near the item to be picked. Likewise, additional information may be included and presented as part of the user specific information. For example, the user specific information may include a visual identifier 211 that is presented over the location of the planned item 213 that is to be picked by the user 204.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In other implementations, the portable device 205 may be detectable and/or communicate with an indoor positioning system. In such an implementation, the portable device 205 may provide the received GPS information to the inventory management system 150. In other implementations, the portable device 205 may be detectable and/or communicate with an indoor positioning system.

Figure 3:
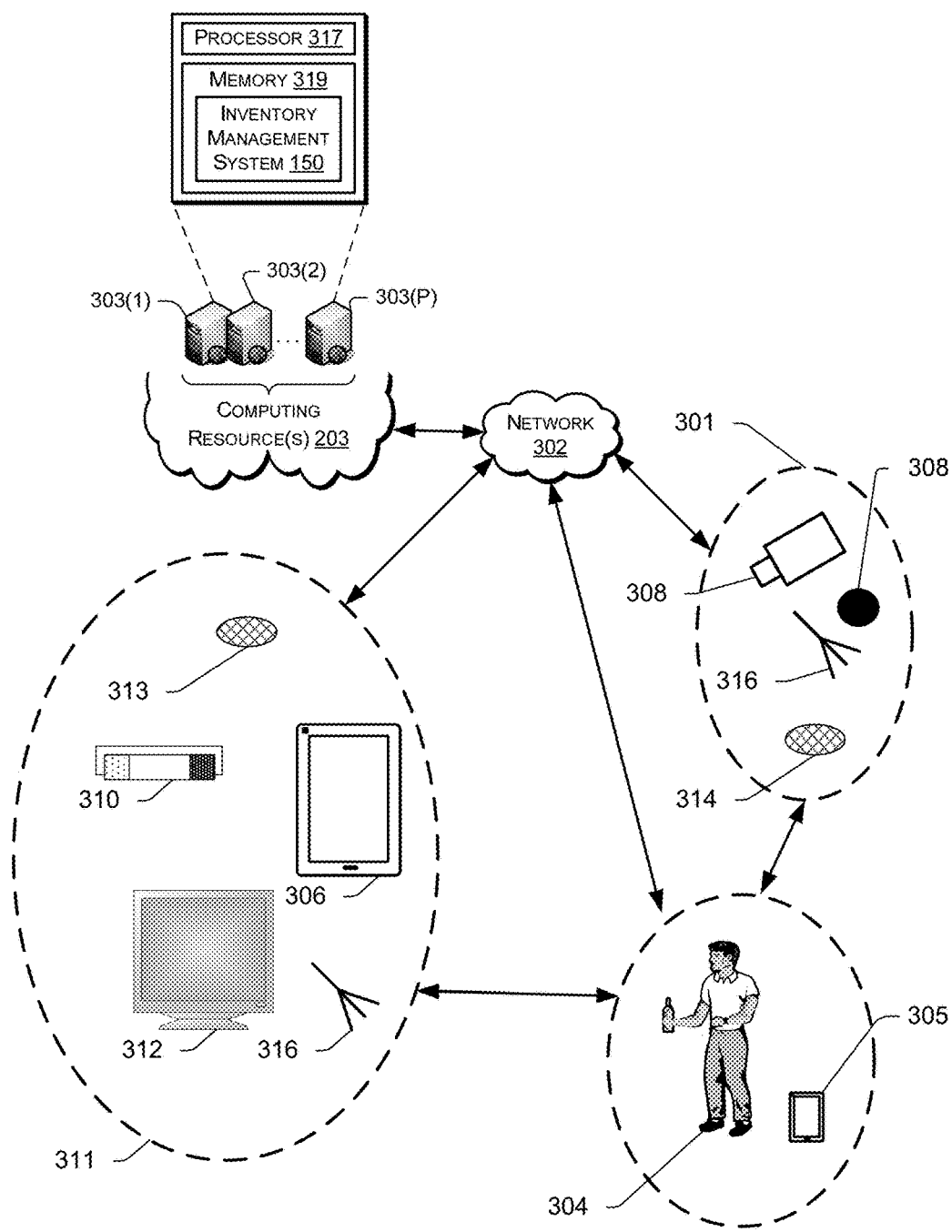
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311 and computing resource(s) 203. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313 and/or any other component that is capable of providing output to the surrounding environment and/or the user.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311 and/or directly with the portable device 305 and/or the user 304.

As illustrated, the computing resource(s) 203 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302 such as the Internet. For example, the computing resources 203 may process images of users 304 to identify the user 304 and/or to identify gestures presented by the user 304. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
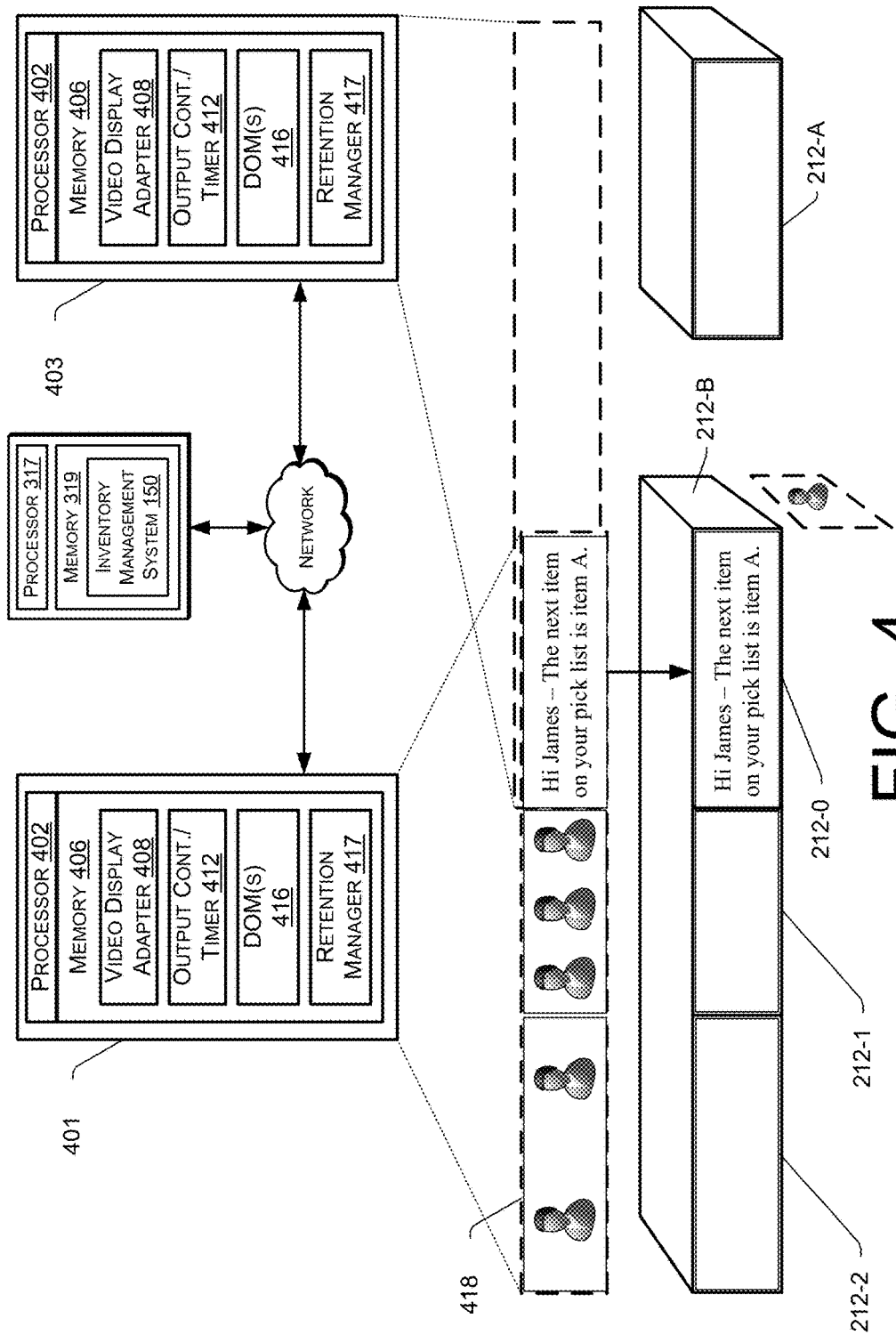
FIG. 4 is a block diagram of multiple output devices within a materials handling facility, according to some implementations.

FIG. 4 is a block diagram of multiple output devices 212-0, 212-1, 212-2, 212-A located within a materials handling facility, according to some implementations. The output devices may be controlled by one or more output device controllers, such as output device controllers 401, 403. Each output device controller 401, 403 is configured to communicate with other output device controllers 401, 403 and/or the inventory management system 150. For example, the output device controllers 401, 403 may communicate to form a peer-to-peer or mesh network, sharing user specific information, propagation patterns, control instructions, timing, retention information, etc. For example, the inventory management system 150 may provide user specific information, control instructions, propagation information and/or retention information to output device controller 401 and output device controller 401 may provide that information to other output device controllers, such as output device controller 403.

In other implementations, the inventory management system 150 may provide user specific information and control instructions to each output device controller. In still other implementations, user specific information, control instructions, propagation information and/or retention information may be communicated from either or both the inventory management system and other output device controllers.

Each output device controller may be configured to control one or more output devices, such as displays 212, and may include a processor 402 and memory 406. The memory may store one or more components for communicating with the inventory management system 150 via the network and/or for presenting information to the user. For example, the memory 406 may include a video display adaptor 408, an output controller/timer 412, a display identifier (not shown), a document object model (DOM) store 416 for storing the document object model and/or the user specific information for each output device that the output device controller is configured to manage, and a retention manager 417 for managing the retention and expiration of information in the memory.

The video display adapter 408 is configured to provide display signals to a display 212 for presenting user specific information on the display. As discussed below, the user specific information may be included in the DOM for the output device and the information identified in the DOM rendered and presented on or by the output device.

In some implementations, the output device controller 401, 403 may control multiple output devices 212 and maintain a DOM for each output device in the DOM store 416. In addition, the output device controller may maintain a virtual DOM that includes the information presented across multiple output devices. The information included in the virtual DOM may be rendered and segmented into DOMs for each output device represented by the virtual DOM. For example, output device controller 401 is configured to control output devices 212-0, 212-1, and 212-2. The user specific information provided by the inventory management system for each of the output devices may be rendered 418 based on the control instructions received for each of the output devices. In this example, the inventory management system 150 has provided user specific information and retention information for output device 212-0, 212-1, 212-2, 212-B and 212-A. The user specific information and retention information for each output device may be stored in the DOM store 416 and the retention information may be used by the retention manager 417. Because the inventory management system 150 has determined that the user is nearest output device 212-0, stopped and is looking at the shelf containing output device 212-2, the inventory management system 150 has provided control instructions to the output device controller 401 to render and present the user specific information on the output device 212-2. In this example, the rendered and presented user specific information states "Hi James—The next item on your pick list is item A."

In addition to providing control instructions to render and present user specific information on output device 212-0, the inventory management system 150 has also provided user specific information and retention information to output device controllers 401, 403 for output devices 212-1, 212-2, 212-A, 212-B. In this example, because the user was moving west down the aisle, the control instructions instruct output device controller 401 to render the user specific information for output devices 212-1 and 212-2, but not present the user specific information. In response, the output device controller 401 stores the user specific information in the DOM store 416 and renders 418 the user specific information.

The retention information may specify a TTL for the user specific information. For example, the retention information may specify a TTL of 30 seconds. When the output device controller 401 receives the user specific information and retention information, it initiates a delay timer. When the delay timer expires, if the information not being displayed on a device, it is expired from the memory of the output device controller 401, 403 and/or any memory of an output device. For example, the user specific information stored in the DOM store 416 may be deleted or otherwise expired based on the retention information.

As illustrated, each item of user specific information may be different. For example, the user specific information for output device 212-0 may include textual information relevant to the user and the location, while the user specific information for output devices 212-1 and 212-2 may include user identifiers that will be presented to the user if the user begins moving west again to assist in guiding the user along a pick path. In some implementations, the user specific information may include multiple states or versions. For example, an animation may have an initial state and multiple transition states that are presented sequentially to illustrate the animation. Rather than transmitting and storing a full representation of each state, the difference between the initial state and each transition state may be determined and only the initial state and each determined difference transmitted. For example, if there is an initial state (IS) and two transition states (TS1 and TS2) a difference D1 between the IS and the TS1 may be determined and a difference D2 between the IS and TS2 may be determined. Rather than propagating IS, TS1 and TS2 to all output device controllers and/or output devices, IS, D1 and D2 may be propagating. To display TS1, the output device controller combines IS and D1 to recreate TS1 for presentation. Likewise, if an output device controller modifies information, it may propagate the change between the initial state and the modified state, rather than the entire modified information, so that other output device controllers can update the information and remain synchronized.

In this example, the inventory management system 150 has also provided control instructions to output device controllers 401 and 403 for control of the user specific information for output devices 212-A, 212-B. In this example, the control instructions for the output device 212-A are to store the provided user specific information, while the control instructions for 212-B are to render but not display the user specific information. The control instructions for 212-A only instruct the output device controller 403 to store the user specific information for output device 212-A because the user was moving away from the direction of the output device 212-A and there is a separation between the user's current location and the location of output device 212-A. In this example, the separation is an aisle. If the user turns and moves east toward output device 212-A, there will be sufficient time as the user crosses the aisle to provide control instructions to render the user specific information and present the user specific information on the display 212-A. Likewise, the control instructions for output device 212-B may include instructions to render the user specific information but not present it because the user is not looking toward the output device 212-B. However, because the output device 212-B is adjacent to output device 212-0, it is close to the user so the information is rendered and ready for presentation in the event the user moves in that direction.

If the user looks at one of the displays, the user specific information may be presented to the user on that display. For example, if the inventory management system determines that the user is looking at 212-0, it will send a control instruction to the output device controller 401 to display the user specific information on the display 212-0. Likewise, it may send a retention information update to both output device controllers 401, 403 to reset the TTL. In other implementations, if the user specific information is being displayed, even if the TTL is exceeded, the user specific information may not be expired until after it is removed from the display. For example, if the user remains looking at the display 212-0, the user specific information will not be expired. In some implementations, the display 212-0, the output device controller 401 and/or the inventory management system may also send retention information updates to the other output device controllers and/or output devices to reset the TTL so the user specific information for those devices is likewise not expired.

Figure 5:
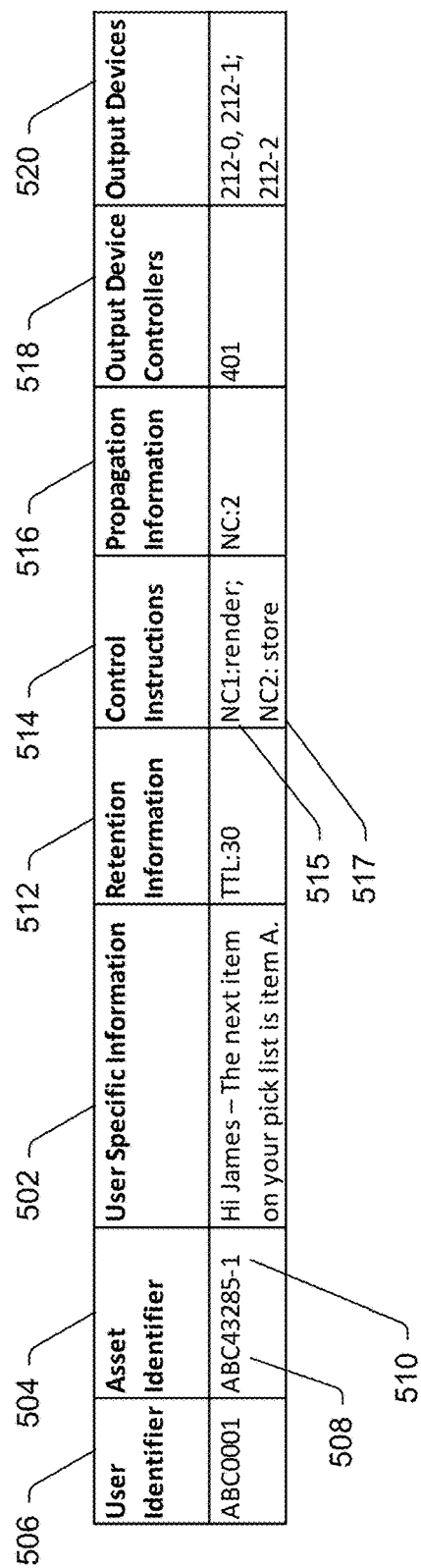
FIG. 5 is a block diagram illustrating associations between information, according to some implementations.

FIG. 5 is a block diagram illustrating associations between information, according to some implementations. The associations may be maintained by the inventory management system in one or more data stores. When user specific information 502 is generated for a user, it may be associated with an asset identifier 504 and/or a user identifier 506. For example, an asset identifier 504, which may be any type of unique identifier, such as a random number, may be generated and associated with the user specific information 502. Likewise, the asset identifier may be associated with the user identifier 506 of the user for which the user specific information is generated. By generating an asset identifier 504 that is associated with the user identifier 506 and the user specific information 502, when the user specific information 502 is transmitted to, for example, an output device controller, the asset identifier 504 may also be transmitted. Transmitting an asset identifier instead of the user specific information 502 provides improved security for the user. In other implementations, the asset identifier may correspond with and/or be the same as the user identifier.

In some implementations, the asset identifier may be a structured identifier, rather than purely random. For example, the asset identifier may have an initial portion 508 that identifies the user and/or the user identifier 506. Alternatively, the initial portion 508 may be random. The asset identifier 504 may also include a version identifier 510. For example, the asset identifier 504 includes a version identifier 510 identifying that the user specific information is an initial version, or an initial state of the user specific information. As discussed further below, user specific information may be versioned or updated and rather than expiring the user specific information, a difference between the two versions may be determined and only the difference sent as the new version. When an output device controller and/or output device receives updated user specific information representative of a difference between the versions, it may merge the received difference and the stored initial version to generate the updated version of the user specific information. In other implementations, the user specific information may include multiple states that can be combined with the initial state. For example, if the user specific information includes a representation of a person walking, the initial state may include the core of the person's body and the different states may include different positions of the limbs of the person's body. When the initial state and one of different states are merged, it generates a position of the person. By generating and representing the different states serially, an animation of a person walking may be generated and presented to a user.

In other implementations, rather than maintain version information in the asset identifier, versions may be determined based on a timestamp or other identifier that is provided with the asset identifier. For example, if the asset identifier is the user identifier and does not include any version information, a time stamp may be generated at the time the user specific information is generated and provided with the user specific information and the asset identifier. The receiving output device controller and/or output device may determine that the received user specific information is an updated version based on the utilization of the same asset identifier and based on the provided time stamp.

In addition to storing an association between the user specific information 502, the asset identifier 504 and/or the user identifier 506, retention information 512, control instructions 514, propagation information 516, output device controllers 518 and output devices 520 may also be associated and stored. The retention information 512 may specify a time duration for how long the user specific information is to be retained before it is expired. Likewise, in some implementations, the retention information 512 may also specify whether the user specific information is to be revalidated before it is expired. For example, the output device controller maintaining the user specific information 502 may request revalidation of the user specific information after the time duration specified in the retention information has expired. Expiration of the time duration may be determined based on a countdown timer, a clock that is compared with the time duration, etc.

The control instructions 514 may specify what is to be done with the user specific information by the receiving output device controller(s). For example, if the user specific information is provided to an output device controller identified as NC1 (neighbor count 1) 515 it may specify that the output device controller is to render the user specific information and pre-cache the information in a memory of the output device controller and/or the output device. Likewise, the control instructions 514 may specify for NC2 (neighbor count 2) 517 that the user specific information is to be stored.

While this example identifies control instructions based on neighbor count, in other implementations, the control instructions may be general for all output devices and/or output device controllers that receive the user specific information. In other implementations, the control instructions may specifically identify output devices and/or output device controllers that received the user specific information.

The propagation information 516 specifies how many neighbors for which the user specific information is to be propagated. For example, the propagation information 516 identifies that the user specific information 502 is to be propagated to two neighbors. When an output device controller receives user specific information, it may determine if the user specific information has already been received based on the asset identifier 504. If the user specific information has not already been received, it may determine whether it is to propagate the user specific information to one or more neighbors. If the user specific information 502 is to be propagated, the propagation count included in the propagation information may be decremented and the user specific information, asset identifier, retention information, control instructions and/or propagation information may be sent to neighbors of the output device controller.

The output device controllers may identify the output device controllers that have received the user specific information 502. In some implementations, each time an output device controller receives user specific information, the receiving output device controller may send a message to the inventory management system identifying that the user specific information has been received, either from the inventory management system and/or from another output device controller (e.g., through propagation). In other implementations, the inventory management system may determine which output device controllers receive the user specific information 502.

In some implementations, each output device controller may correspond with an output device. In other implementations, as discussed above, the output device controller may be associated with and control multiple output devices. The output devices may include memory to which user specific information 502 may be provided. If the user specific information 502 is provided to an output device, such as output devices 212-0, 212-1, 212-2, the output devices may be associated with the user specification information 502. In some implementations, when an output device receives user specific information 502 (e.g., from the inventory management system, from an output device controller, or from another output device), it may provide a notification to the inventory management system that it has received the user specific information and the inventory management system may associate the output device with the user identifier 506. In other implementations, if an output device controller provides the user specific information to an output device, the output device controller may provide a notification to the inventory management system identifying the output device to which the user specific information was provided.

Regardless of whether the inventory management system maintains an association between the output device controller(s) and/or output device(s) that may have received the user specific information, by maintaining an association, retention information updates, control instruction updates and/or updated user specific information may be provided. In other implementations, if no information is maintained as to the output device controllers and/or output devices that are storing the user specific information, a broadcast may be transmitted to all output device controllers and/or output devices providing updated retention information, control instructions and/or user specific information. In each instance, the updates may be sent with the corresponding asset identifier 504 so that the receiving output device controller(s) and/or output device(s) can identify the corresponding information.

Figure 6:
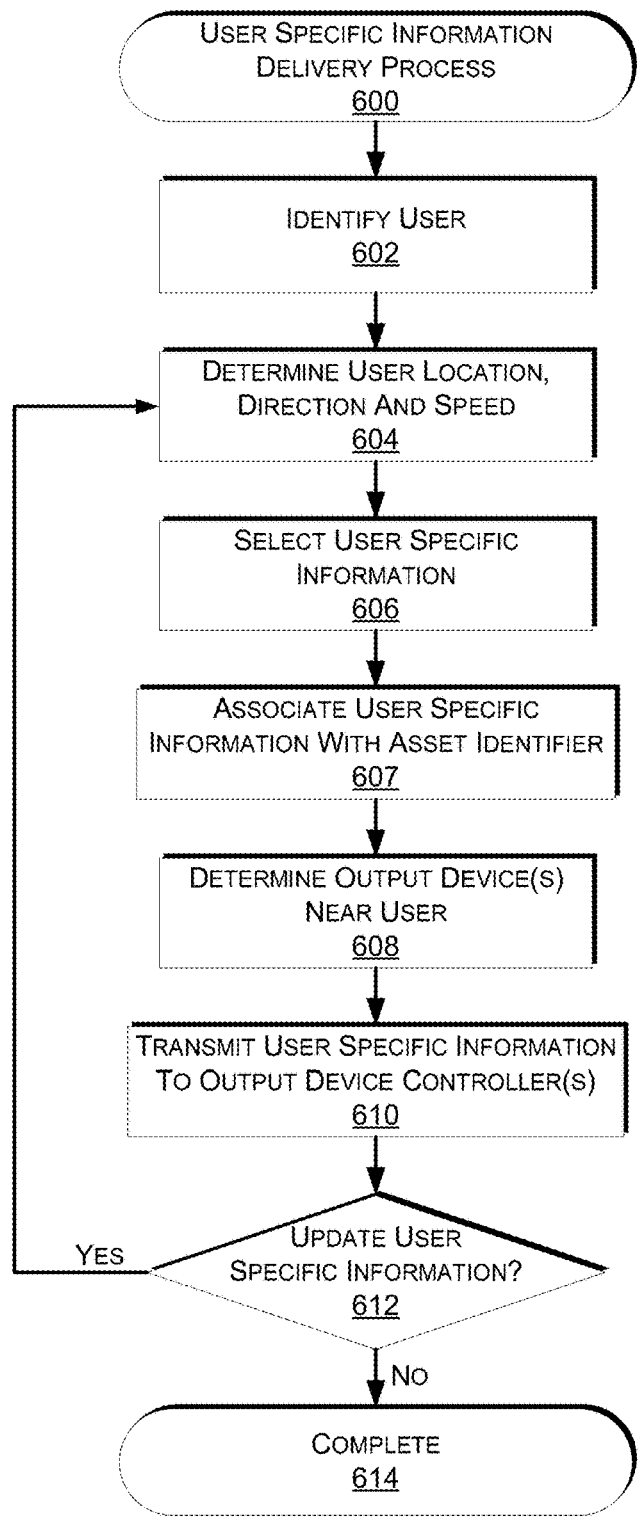
FIG. 6 is a flow diagram of an example user specific information delivery process, according to some implementations.
Figure 7:
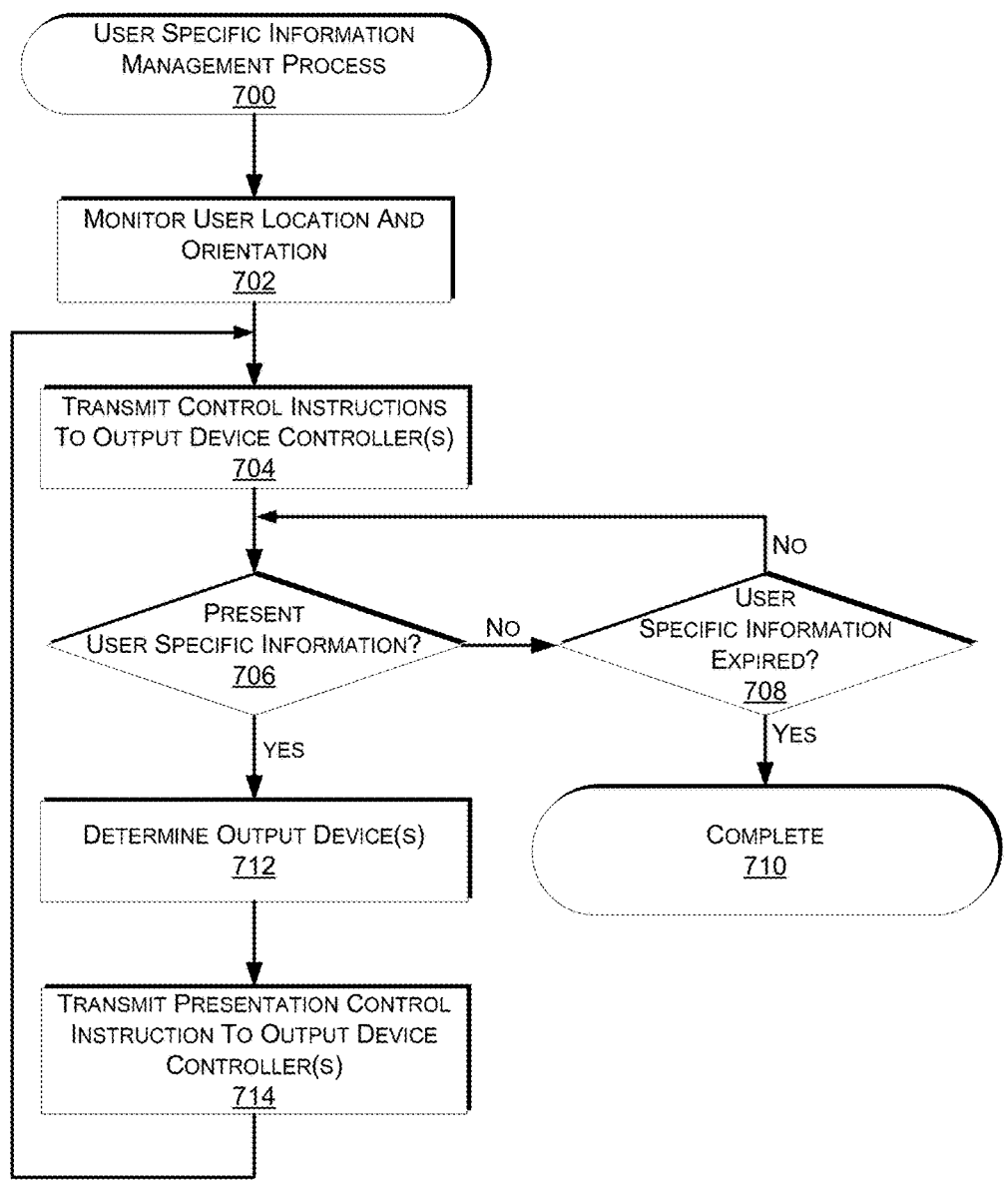
FIG. 7 is a flow diagram of an example user specific information management process, according to some implementations.

FIGS. 6-7 describe an example process for monitoring a user within the materials handling facility, providing user specific information and control instructions to output device controllers configured to control output devices near the user's location, for providing user specific information when desired by the user and expiring user specific information. The example processes of FIGS. 6-7 are described with respect to a server-client relationship. Specifically, in these examples, the inventory management system operates as the server to control which output device controllers receive user specific information, control instructions and/or retention information. For example, the inventory management system 150, may utilize one or more input devices (e.g., image capture devices) to monitor the location, direction, orientation and/or speed of the user and based on that information may query an output data store (discussed below) to identify output devices and corresponding output device controllers. User specific information, control instructions and/or retention information are then provided to those output device controllers so that user specific information can be quickly presented to the user and the presentation and expiration of user specific information can be synchronized across multiple displays as the user moves through the materials handling facility. The output device controllers operate as the clients, receiving user specific information and/or control instructions from the inventory management system and taking action on the user specific information as instructed in the control instructions. Likewise, the output device controllers expire the user specific information based on the retention information.

The process of FIG. 6 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by identifying a user in the materials handling facility, as in 602. Various techniques may be used for identifying a user within the materials handling facility. For example, one or more images of the user may be obtained and processed using image and/or facial recognition. The processed images may be compared with stored visual information about the user (e.g., facial features) and used to identify the user. In other examples, a user identifier may be provided by the user and/or detected by the inventory management system 150. A user identifier may be any unique identification that is associated with the user. For example, the user identifier may be an active tag, such as a radio frequency identification ("RFID") tag, visual tag, such as a barcode, bokode, etc., a user provided identifier (e.g., user name and password), biometric identification, or any other type of identifier that may uniquely identify the user.

In some implementations, distinguishing features of the user may also be detected and used to assist in monitoring the user as they move throughout the materials handling facility. For example, if the user is wearing a bright colored shirt, has a tattoo, is wearing a hat, etc., any of those distinguishing features may be detected and used to assist in monitoring the user. Likewise, the user's gait, cadence, body language, speed, etc., may be determined and used to monitor and/or identify the user while in the materials handling facility.

Returning to FIG. 6, in addition to identifying the user, the user's location, direction, and/or speed within the materials handling facility may be determined, as in 604. Similar to user identification, one or more image capture devices may capture images of the user and those images may be processed to determine the orientation, direction and/or speed of the user within the materials handling facility. Other input devices within the materials handling facility may also be used. For example, one or more pressure and/or weight sensors may be included in the floor of the materials handling facility and used to detect the steps or other movement of the user. Based on a series of detected steps/movement, the orientation, direction and/or speed of the user can be determined.

User specific information that is at least partially unique to the user and/or the current location of the user is also selected, as in 606. User specific information may vary for different users based on user preferences that are included in a user profile associated with the user. For example, a user may provide or be assigned a user identifier that may be presented to illustrate a path (e.g., pick path) the user is to take through the materials handling facility. For example, if the user is to follow a pick path that routes the user through the materials handling facility and past each item to be picked by the user (items on the user pick list), a user identifier that is unique to the user may be included in the user specific information. Likewise, other types of user specific information may be selected for the user. For example, item recommendations, suggestions or pairings with items currently in the user's possession may be identified and included in the user specific information. For example, if the user has a bottle of wine and it is determined that they are in the location of materials handling facility that stores cheese, an item recommendation for a cheese near the user's location may be generated and included in the user specific information.

The form type and content of user specific information may vary for each user. For example, some users may prefer only minimal information about the items at a location or only static representations of user identifiers for providing path guidance. In comparison, some users may be interested in receiving recommendations, item details, past purchase history, advertisements, etc., as part of the user specific information. Likewise, some user specific information may include animations that are presented to the user and/or used to provide path guidance. For example, the user identifier may be animated and follow the user through the materials handling facility providing animated path guidance that is specific to the user. If the user specific information is being updated, the selected user specific information may be an update to the previously utilized user specific information. For example, if the user specific information includes a pick list identifying items the user is to pick from the materials handling facility and the user has completed picking one of those items, the user specific information may be updated to remove the item from the pick list and/or identify that the item has been picked. In such an example, some or all other aspects of the user specific information may remain unchanged.

Regardless of the type and content of the user specific information, the user specific information is associated with an asset identifier, as in 607. As discussed above, the asset identifier may be a unique identifier that is associated with the user identifier of the user and the user specific information. In other implementations, the asset identifier may be the same as the user identifier associated with the user. In some implementations, the asset identifier may include a version or other structured information. For example, the asset identifier may include a unique identification that is associated with the user and/or the user's identifier and a version identifier. Each time if the user specific information is updated, the asset identifier may only be changed to identify the updated version. For example, an initial version (or initial state) of the user specific information may be associated with the asset identifier ABC03465-1. When the user specific information is updated, the corresponding asset identifier associated with the updated user specific information may be ABC03465-2.

Based on the user's location within the materials handling facility, one or more output devices are determined, as in 608. In some implementations, a set number of output devices may be selected that are near the user. In one implementation, the six output devices nearest the user may be determined. In other implementations, output devices within a distance (e.g., 5 feet radius around the user) of the user may be determined. In still other implementations, the direction and speed of the user may be considered and used as a factor in selecting output devices. For example, if the user is moving, the direction of the user may be determined and the five output devices that are physically next to and ahead of the user along the current path of the user may be selected. Likewise, the two output devices physically behind the user and along the path of the user may be selected as output devices.

Upon selecting one or more output devices, user specific information is transmitted to the output device controllers configured to control the determined output devices, as in 610. In some implementations, the user specific information may be the same for each output device. In other implementations, some or all of the user specific information may be different for different output devices. For example, a user identifier may be included in the user specific information for each output device, but any item information (e.g., recommended items, item details, advertisements) may be different depending on both the user profile and the location of the output device.

As the user moves through the materials handling facility and/or interacts with items in the materials handling facility, a determination is made as to whether some or all of the user specific information is to be updated, as in 612. For example, if the user picks an item, the user specific information for the output device near the picked item may be updated to include additional information about the picked item. Likewise, user specific information for other output devices may be updated based on the picked item. For example, if the user picks an item, other related items may be identified and user specific information for output devices near those related items may be updated to include information and/or recommendations for the user to identify those related items. If it is determined that the user specific information is to be updated, the example process returns to block 604 and continues. If it is determined that the user specific information is not to be updated, the example process 600 completes, as in 614.

FIG. 7 is a flow diagram of an example user specific information management process 700, according to some implementations. The example process 700 begins by monitoring a user location and orientation within a materials handling facility, as in 702. Similar to identifying a user, discussed above, a variety of techniques may be used to monitor the location and orientation of a user. For example, one or more images of the user may be captured and processed to identify and monitor the location of the user as well as determine the orientation of the user. For example, if a distinguishing identifier (e.g., yellow shirt, tattoo) has been associated with the user, the captured images may be processed using object recognition to identify the distinguishing feature(s). Likewise, the object recognition can be used to determine the orientation of the user. In other examples, other user identifiers may be received and used to monitor the user. Likewise, one or more floor sensors (e.g., weight sensors, pressure sensors, load cells) may be included in the floor and used to determine the orientation of the user. For example, if the user is standing, the floor sensors may be used to determine the location and position of each of the user's feet. The location and position of each foot may be used to determine, or assist in determining, the orientation of the user.

In some implementations, if the user is moving, the speed and direction of the user may also be determined. For example, the processed images and/or information from the floor sensors may be used to determine the direction and speed of the user as they move through the materials handling facility.

Based on the determined location and orientation of the user (and optionally the direction and speed of the user), control instructions and retention information are transmitted to one or more output device controllers that are configured to control output devices near the user, as in 704. As discussed above, an output device controller may control one or more output devices. Likewise, the control instructions and/or retention instructions may be the same or different for each output device. In some implementations, where the output device controller controls multiple output devices, for each output device that will receive the same control instruction (e.g., render but do not display), the control instructions may only be provided once to the output device controller along with output device identifiers identifying the output devices that are to receive the control instructions. In some implementations, the control instructions may include an instruction to render the user specific information, an instruction to pre-cache or otherwise store the user specific information and/or a control instruction to present the user specific information on the output device.

The location, orientation, direction and/or speed of the user may be monitored and a determination made as to whether user specific information for any of the output devices is to be presented, as in 706. For example, the user may specify or prefer to only have user specific information presented when they are stopped and looking in the direction of an output device (e.g., looking at an inventory location that includes an output device). In other implementations, if the user is moving, the user identifier may be presented on the output device adjacent to the user and on a select number of output devices in front of the user to assist in providing guidance along a pick path. In some implementations, the user specific information may be animated and transition across multiple output devices as the user moves. If it is determined that the user specific information is not to be presented, a determination is made as to whether the user specific information has expired, as in 708. Expiration of user specific information is discussed further below with respect to FIG. 12. If it is determined that the user specific information has expired, the example process completes, as in 710. If it is determined that the user specific information has not expired, the example process returns to decision block 706 and continues.

Returning to decision block 706, if it is determined that user specific information is to be presented to the user, the output device(s) nearest the user and/or in the direction of the user's orientation are determined, as in 712. For example, the captured images of the user and/or information obtained for floor sensors may be processed to determine the user's location and/or orientation and the output device data store may be queried to identify the appropriate output device(s) at that location. For the determined output device(s), control instructions may be transmitted to the output device controller configured to control the determined output device instructing the output device controller to present the user specific information, as in 714. Upon transmitting the instructions, the example process 700 returns to block 704 and continues. For example, updated control instructions for adjacent output devices may be transmitted instructing those devices to render stored user specific information.

In some implementations, a determination may be made as to whether the user has interacted with the output device. For example, if the output device is a touch-based display, after transmitting the presentation control instructions to the output device controller for a determined output device, the example process 700 may determine if a user input has been received at the output device. If a user input has been received, the output device controller may provide the received input to the inventory management system for further processing. The further processing may result in a variety of actions, such as updated control instructions and/or presentation instructions being presented to the output device controller.

Figure 8:
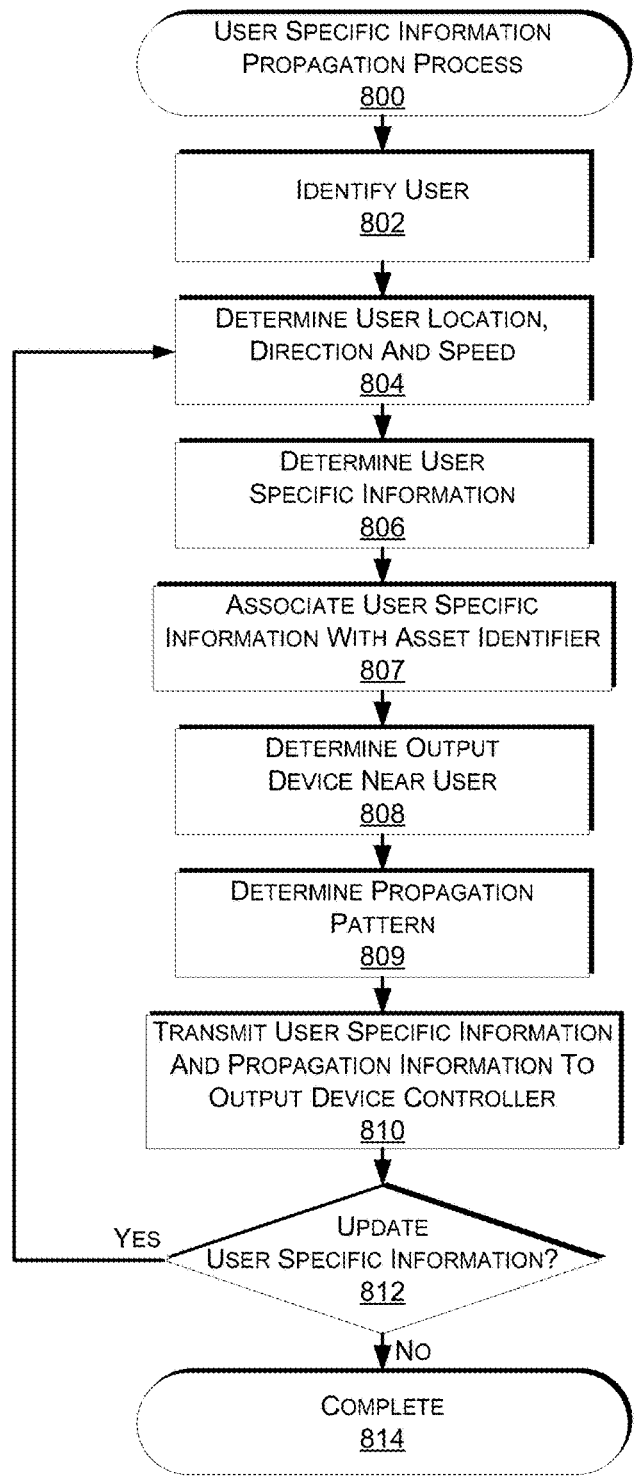
FIG. 8 is a flow diagram of an example user specific information propagation process, according to some implementations.
Figure 9:
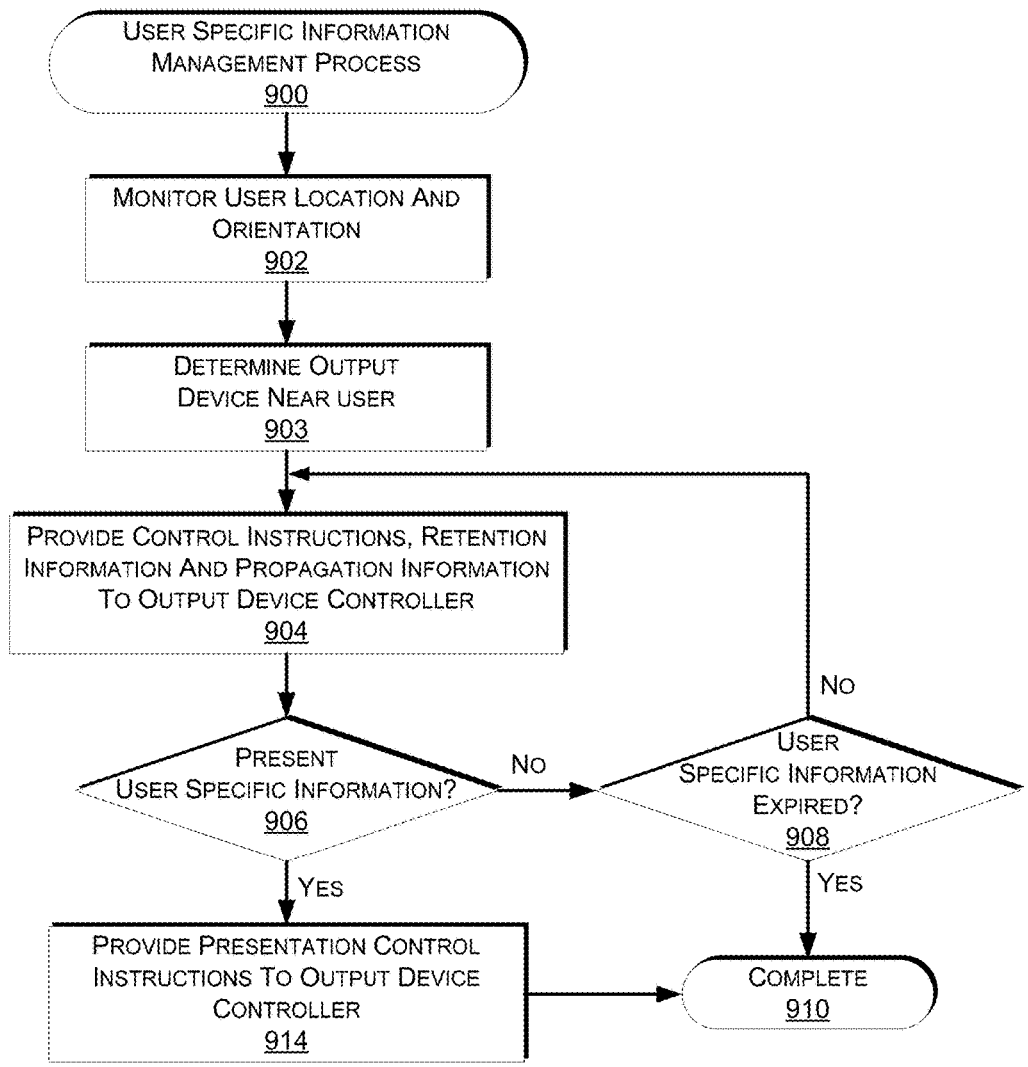
FIG. 9 is a flow diagram of an example user specific information management process, according to some implementations.
Figure 10:
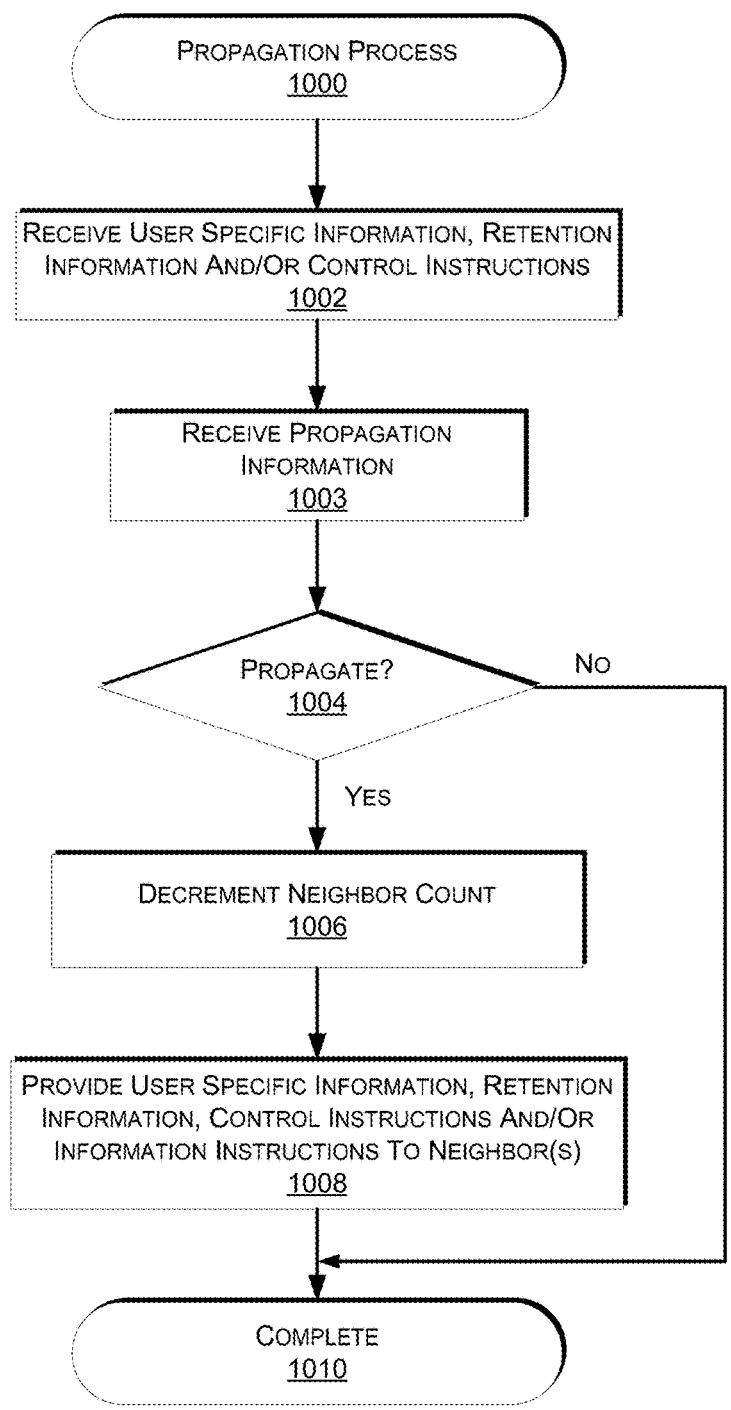
FIG. 10 is a flow diagram of an example propagation process, according to some implementations.

FIGS. 8-10 describe another example process for monitoring a user within the materials handling facility, providing user specific information and control instructions to output device controllers configured to control output devices near the user's location and for providing user specific information when desired by the user. The example processes of FIGS. 8-10 are described with respect to a peer-to-peer relationship between the output device controllers and a potentially varying client-server relationship between the inventory management system (server) and one or more of the output device controllers (client). For example, the inventory management system 150, may utilize one or more input devices (e.g., image capture devices) to monitor the location, direction, orientation and/or speed of the user and based on that information may query an output data store (discussed below) to identify an output device and corresponding output device controller. User specific information, control instructions and/or retention information are then provided to the output device along with propagation information for propagating the user specific information, control instruction and retention information and propagation information to output device controllers configured to control output devices that are adjacent or near the identified output device. When the output device controller receives the user specific information, control instructions, retention information and/or propagation information, it executes any instructions for the output device controller and determines, based on the propagation information, whether to propagate the control instructions, retention information and/or user specific information to other output device controllers that are configured to control neighboring output devices. If it is to provide the user specific information, control instructions, retention information and/or propagation information, a neighbor count is decremented in the propagation information and the information is provided to one or more output device controllers. The neighbor count may identify the number of neighbor devices that are to receive the user specific information, the control instructions and/or the retention information. For example, the neighbor count may identify to propagate the user specific information and/or the control instructions to five neighbors in one direction (the direction in which the user is moving) and one neighbor in the opposite direction.

The example process 800 of FIG. 8 begins by identifying a user in the materials handling facility, as in 802. Various techniques may be used for identifying a user within the materials handling facility. For example, one or more images of the user may be obtained and processed using image and/or facial recognition. The processed images may be compared with stored visual information about the user (e.g., facial features) and used to identify the user. In other examples, a user identifier may be provided by the user and/or detected by the inventory management system 150. A user identifier may be any unique identification that is associated with the user. For example, the user identifier may be an active tag, such as a radio frequency identification ("RFID") tag, visual tag, such as a barcode, bokode, etc., a user provided identifier (e.g., user name and password), biometric identification, or any other type of identifier that may uniquely identify the user.

In some implementations, distinguishing features of the user may also be detected and used to assist in monitoring the user as they move through the materials handling facility. For example, if the user is wearing a bright colored shirt, has a tattoo, is wearing a hat, etc., any of those distinguishing features may be detected and used to assist in monitoring the user. Likewise, the user's gait, cadence, body language, speed, etc., may be determined and used to monitor and/or identify the user while in the materials handling facility.

Returning to FIG. 8, in addition to identifying the user, the user's location, direction, and/or speed within the materials handling facility may be determined, as in 804. Similar to user identification, one or more image capture devices may capture images of the user and those images may be processed to determine the orientation, direction and speed of the user within the materials handling facility. Other input devices within the materials handling facility may also be used. For example, one or more pressure and/or weight sensors may be included in the floor of the materials handling facility and used to detect the steps or other movement of the user. Based on a series of detected steps/movement, the orientation, direction and/or speed of the user can be determined.

User specific information that is at least partially unique to the user and/or the current location of the user is also selected, as in 806. User specific information may vary for different users based on user preferences that are included in a user profile associated with the user. For example, a user may provide or be assigned a user identifier that may be presented to illustrate a path (e.g., pick path) the user is to take through the materials handling facility. For example, if the user is to follow a pick path that routes the user through the materials handling facility and past each item to be picked by the user (items on the user pick list), a user identifier that is unique to the user may be included in the user specific information. Likewise, other types of user specific information may be selected for the user. For example, item recommendations, suggestions or pairings with items currently in the user's possession may be identified and included in the user specific information. For example, if the user has a bottle of wine and it is determined that they are in the location of the materials handling facility that stores cheese, an item recommendation for a cheese near the user's location may be generated and included in the user specific information.

The form type and content of user specific information may vary for each user. For example, some users may prefer only minimal information about the items at a location or only static representations of user identifiers for providing path guidance. In comparison, some users may be interested in receiving recommendations, item details, past purchase history, advertisements, etc., as part of the user specific information. Likewise, some user specific information may include animations that are presented to the user and/or used to provide path guidance. For example, the user identifier may be animated and follow the user through the materials handling facility providing animated path guidance that is specific to the user.

If the user specific information is being updated, the selected user specific information may be an update to the previously utilized user specific information. For example, if the user specific information includes a pick list identifying items the user is to pick from the materials handling facility and the user has completed picking of one of those items, the user specific information may be updated to remove the item from the pick list and/or identify that the item has been picked. In such an example, some or all other aspects of the user specific information may remain unchanged.

Regardless of the type and content of the user specific information, the user specific information is associated with an asset identifier, as in 807. As discussed above, the asset identifier may be a unique identifier that is associated with the user identifier of the user and the user specific information. In other implementations, the asset identifier may be the same as the user identifier associated with the user. In some implementations, the asset identifier may include a version or other structured information. For example, the asset identifier may include a unique identification that is associated with the user and/or the user identifier and a version identifier. Each time the user specific information is updated, the asset identifier may only be changed to identify the updated version. For example, an initial version (or initial state) of the user specific information may be associated with the asset identifier ABC03465-1. When the user specific information is updated, the corresponding asset identifier associated with the updated user specific information may be ABC03465-2.

Based on the user's location within the materials handling facility, an output device is determined, as in 808. In some implementations, the output device closest to the user's location may be determined. Upon determining an output device, a propagation pattern is determined, as in 809. The propagation pattern may identify the number of neighbor output devices that are to receive the user specific information and/or the control instructions. For example, a set number of output devices adjacent to the identified device may be selected that are near the user for which the user specific information and control instructions are to be propagated. In one implementation, the six output devices nearest the determined output device may be determined. In other implementations, the direction and speed of the user may be considered and used as a factor in selecting output devices. For example, if the user is moving, the direction of the user may be determined and the propagation information may instruct the determined output device to provide the user specific information and control instructions to the output device controller that controls the output device that is adjacent to the determined output device and in the direction of the user's path. In addition, the neighbor count for that direction may be set to five. As the information is provided, the receiving output device controller may decrement the neighbor count and provide the user specific information and/or control instructions to the next neighbor. This may continue until the neighbor count is decremented to zero. Likewise, the propagation information may instruct the determined output device to propagate the user specific information and/or control instructions with the output device controller configured to control the output device that is adjacent to the determined output device but behind the user. In a similar manner, the user specific information may be propagated to those adjacent output device controllers.

As will be appreciated, the user specific information and/or control instructions may vary for each output device and/or output device controller. For example, the control instructions and/or user specific information may be included in a stack of control instructions and each output device controller may receive the stack, use the top control instructions and/or user specific information and propagate the remainder of the stack to the next output device controller. In addition to propagating user specific information and/or control instructions, the output device controllers may exchange processing capabilities, network latency information and/or other information that may be used by other output device controllers and/or the inventory management system 150 to synchronize the presentation of user specific information. Such information may be provided regardless of whether the communication is configured as peer-to-peer, client-server, or any other configuration. In another implementation, rather than using a neighbor count and/or a stack, each output device and/or output device controller may have a unique identifier. When the inventory management system 150 provides the user specific information, and/or control instructions, it may provide unique identifiers indicating which output devices and/or output device controllers are to receive the user specific instruction and/or control instructions.

In some implementations, output device controllers that receive control instructions and/or user specific information may periodically check to see if updated information (user specific information and/or control instructions) is available.

In another implementation, rather than providing propagation information, in some implementations, the output device controllers may determine where the respective output devices are positioned with respect to the user and determine whether to maintain the user specific information and/or control instructions. For example, the output device controller may poll the inventory management system for information regarding the position of output devices with respect to the user. Alternatively, the output device controller may include and/or control an input device (e.g., camera) that can be used to determine the position of the user with respect to the corresponding output devices. This information may be periodically updated as the user moves through the materials handling facility.

Returning to FIG. 8, user specific information and the propagation pattern is transmitted to the output device controller configured to control the determined output device, as in 810. As the user moves through the materials handling facility and/or interacts with items in the materials handling facility, a determination is made as to whether some or all of the user specific information is to be updated, as in 812. For example, if the user picks an item, the user specific information for the output device near the picked item may be updated to include additional information about the picked item. Likewise, user specific information for other output devices may be updated based on the picked item. For example, if the user picks an item, other related items may be identified and user specific information for output devices near those related items may be updated to include information and/or recommendations for the user to identify those related items. If it is determined that the user specific information is to be updated, the example process returns to block 804 and continues. If it is determined that the user specific information is not to be updated, the example process 800 completes, as in 814.

FIG. 9 is a flow diagram of an example user specific information management process 900, according to some implementations. The example process 900 begins by monitoring a user location and orientation within a materials handling facility, as in 902. Similar to identifying a user, discussed above, a variety of techniques may be used to monitor the location and orientation of a user. For example, one or more images of the user may be captured and processed to identify and monitor the location of the user as well as determine the orientation of the user. For example, if a distinguishing identifier (e.g., yellow shirt, tattoo) has been associated with the user, the captured images may be processed using object recognition to identify the distinguishing feature(s). Likewise, the object recognition can be used to determine the orientation of the user. In other examples, other user identifiers may be received and used to monitor the user. Likewise, one or more floor sensors (e.g., weight sensors, pressure sensors, load cells) may be included in the floor and used to determine the orientation of the user. For example, if the user is standing, the floor sensors may be used to determine the location and position of each of the user's feet. The location and position of each foot may be used to determine, or assist in determining, the orientation of the user.

In some implementations, if the user is moving, the speed and direction of the user may also be determined. For example, the processed images and/or information from the floor sensors may be used to determine the direction and speed of the user as they move through the materials handling facility.

Based on the determined location and orientation of the user (and optionally the direction and speed of the user), an output device near the user is determined, as in 903. Control instructions and retention information are then transmitted to the output device controller that is configured to control the determined output device, as in 904. As discussed above, an output device controller may control one or more output devices. Likewise, the control instructions, like the user specific information, may be provided as a stack or set of control instructions, which may be the same or different for each output device. The propagation information may identify multiple sets of neighbors that correspond to different areas of output devices. For example, one set of neighbors may be adjacent and to the left of the output device. Another set of neighbors may be adjacent and to the right of the output device. Other neighbors may be above, below and/or across from the output device. As the control instructions, retention information and/or user specific information is propagated to different neighbors, each neighbor takes action on the information and, if appropriate, propagates the user specific information and/or control instructions to the next neighbor. Likewise, each output device controller will maintain the user specific information based on the received retention information.

The location, orientation, direction and/or speed of the user may be monitored and a determination made as to whether user specific information for any of the output devices is to be presented, as in 906. For example, the user may specify or prefer to only have user specific information presented when they are stopped and looking in the direction of an output device (e.g., looking at an inventory location that includes an output device). In other implementations, if the user is moving, the user identifier may be presented on the output device adjacent to the user and on a select number of output devices in front of the user to assist in providing guidance along a pick path. In some implementations, the user specific information may be animated and transition across multiple output devices as the user moves. If it is determined that the user specific information is not to be presented, a determination is made as to whether the user specific information has expired, as in 908. Expiration of user specific information is discussed below with respect to FIG. 12. If it is determined that the user specific information has expired, the example process 900 completes, as in 910. However, if it is determined that the user specific information has not expired, the example process returns to decision block 906 and continues.

Returning to decision block 906, if it is determined that user specific information is to be presented to the user, control instructions are transmitted from the inventory management system to the output device controller configured to control the determined output device instructing the output device controller to present the user specific information, as in 914. Upon transmitting the control instructions, the example process 900 completes, as in 910.

FIG. 10 is a flow diagram of an example propagation process, according to some implementations. The example propagation process 1000 begins with an output device controller receiving user specific information, retention information and/or control instructions, as in 1002. In addition to receiving the user specific information, retention information and/or control instructions, the output device controller may receive propagation information, as in 1003. As discussed above, the propagation information may identify how/whether the user specific information, retention information and/or control instructions are to be propagated. In one implementation, each output device controller may have six potential neighbors (left, right, above, below, across and behind) and the propagation information may identify how many neighbors in each direction are to receive the user specific information, retention information and/or control instructions. For example, the propagation information may include a neighbor count for each potential neighbor identifying which neighbors are to receive the control instructions, retention information and/or the user specific information. In other implementations, an output device may have more or fewer neighbor output devices. Likewise, output devices may be the same or different types of output devices. For example, one or more output devices may be a display while others may be video projectors, audio outputs, etc.

Based on the received propagation information, a determination is made as to whether the user specific information, retention information, and/or control instructions are to be propagated, as in 1004. For example, if the neighbor count for a potential neighbor is zero or if no other devices are identified, it may be determined that the user specific information, retention information and/or control instructions are not to be propagated in that direction. If the neighbor count is a positive number, it may be determined that the user specific information, retention information and/or control instructions are to be propagated to that neighbor. In other implementations, rather than utilizing a neighbor count and/or received propagation information, the output device controller may determine the position of the controlled output devices with respect to the user and determine whether to propagate the user specific information, retention information and/or control instructions to output device controllers that are configured to control neighboring output devices.

In still another implementation, rather than determining if a neighbor should receive the user specific information, retention information and/or control instructions, the information and instructions may be propagated to all neighbors equally. For example, if the neighbor count is 2, the output device controller may propagate or transmit the user specific information, retention information and/or control instructions to each of the neighbors. Each of the receiving output device controllers will decrement the neighbor count and, if the count is still positive, transmit the user specific information, retention information and/or control instructions to each of its neighbors. This may include propagating the information back to the neighbor that sent the information or propagating to all neighbors except for the neighbor(s) from which it received the information. When broadcast and utilized, an output device controller may receive the user specific information, retention information and/or control instructions from multiple neighbors. In such an example, if the asset identifiers are the same, the output device controller will only act on the first received user specific information, retention information and/or control instructions and discard the others. For example, it may implement the control instructions, initiate a TTL timer identified in the retention information and/or propagate the user specific information, retention information and/or control instructions based on the first received asset identifier. For each subsequent receipt of the same asset identifier, the corresponding content (user specific information, retention information, control instructions) will be discarded. As discussed further below, in some implementations, the asset identifier may be partially unique and include different versions or states to identify updates to the user specific information. In such an implementation, the different versions of the user specific information may be combined to generate current user specific information.

If the user specific information is to be propagated, the neighbor count for the direction of the propagation is decremented, as in 1006, and the user specific information, control instructions, retention information and propagation instruction (e.g., decremented neighbor count) for that neighbor is provided, as in 1008. In some implementations, the user specific information, retention information and/or control instructions may be different for each neighbor and/or for different sets of neighbors. In such an instance, the user specific information, retention information and/or control instructions may include different sets of information and/or instructions for each neighbor. As the user specific information, retention information and/or control instructions are propagated, each receiving output device controller obtains the appropriate user specific information, retention information and/or control instructions and continues the propagation.

If it is determined that the user specific information, retention information and/or control instructions are not to be propagated or after propagating the user specific information and/or control instructions, the example propagation process 1000 completes, as in 1010.

Figure 11:
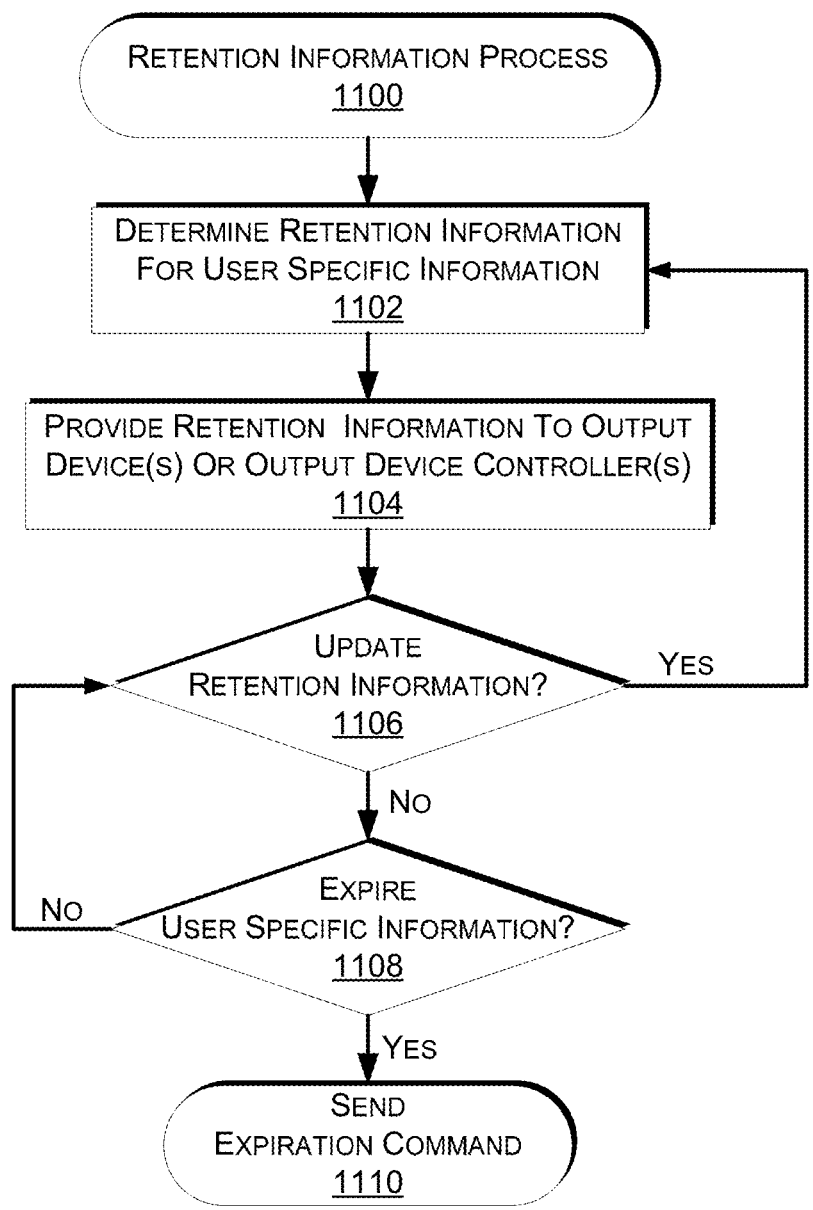
FIG. 11 is a flow diagram of an example retention information process, according to some implementations.

FIG. 11 is a flow diagram of an example retention information process 1100, according to some implementations. The example process 1100 begins by determining the retention information for user specific information that is provided to an output device and/or output device controller, as in 1102. In some implementations, the retention information may be the same for all users. For example, the retention information for any user specific information may be 30 seconds. In other implementations, the retention information may be different for different users, different locations within the materials handling facility and/or different based on activities of the user. For example, if it is determined that the user is moving quickly through the materials handling facility, the TTL included in the retention information may be reduced because the user will likely move away from the output device quickly. In comparison, if it is determined that the user is moving slowly through the materials handling facility, the TTL included in the retention information may be increased. In addition to determining a TTL (also referred to herein as a delay timer or time duration), other retention information characteristics may also be determined. For example, the retention information may specify whether the user specific information is to be revalidated upon expiration of the delay timer or time duration before the user specific information is expired.

In some implementations, the retention information may be a retention information update to be applied to user specific information that has already been provided to output device(s) and/or output device controller(s). As discussed below, retention information may be updated to keep the user specific information from expiring. For example, if the user is still in the area near an output device that includes the user specific information, the retention information may be updated by resetting or extending the delay timer or time duration so that the user specific information will not be expired. In some implementations, the time duration may be reset by resetting the countdown timer, setting a new time duration against which the clock is compared, etc.

Once the retention information is determined, the retention information is provided to the output device(s) or output device controller(s), as in 1104. In some implementations, the retention information may be provided at the same time as the user specific information corresponding to the retention information. In other implementations, the retention information may be provided separately. For example, if the retention information is provided separately, it may be associated with the asset identifier that corresponds to the user specific information. The output device(s) and/or output device controller(s) will receive the retention information and associate it with the corresponding user specific information based on the asset identifier.

The example process 1100 also determines whether the retention information corresponding to user specific information is to be updated, as in 1106. For example, as noted above, if it is determined that the user is still in the area of an output device that includes the user specific information, it may be determined that the retention information is to be updated so the user specific information is not expired.

If it is determined that the retention information is to be updated, the example process 1100 returns to block 1102 and continues. However, if it is determined that the retention information is not to be updated, a determination is made as to whether the user specific information is to be expired, as in 1108. For example, if it is determined that the user has departed the materials handling facility, it may be determined that the user specific information maintained by any of the output devices and/or output device controllers is to be expired. As another example, if the user specific information is determined to be old or out of date, the user specific information may be expired so it is not presented to the user. For example, if the user specific information includes a representation of a pick list of items to be picked by the user and the pick list changes (e.g., the user picks an item, an item is added to the pick list, an item is removed from the pick list), it may be determined that the user specific information is to be expired and not presented to the user.

If it is determined that the user specific information is not to be expired, the example process 1100 returns to block 1106 and continues. If it is determined that the user specific information is to be expired, an expiration command is sent to each device and/or output device controller that has received the user specific information, as in 1110. In some implementations, the expiration command may include an asset identifier for the user specific information and an expiration command is sent to immediately expire the user specific information. The expiration command may result in immediate expiration of the user specific information, even if it was being presented on an output device. In other implementations, the expiration command may be a retention information update, setting the delay timer or time duration to zero, thereby resulting in expiration of the user specific information.

Figure 12:
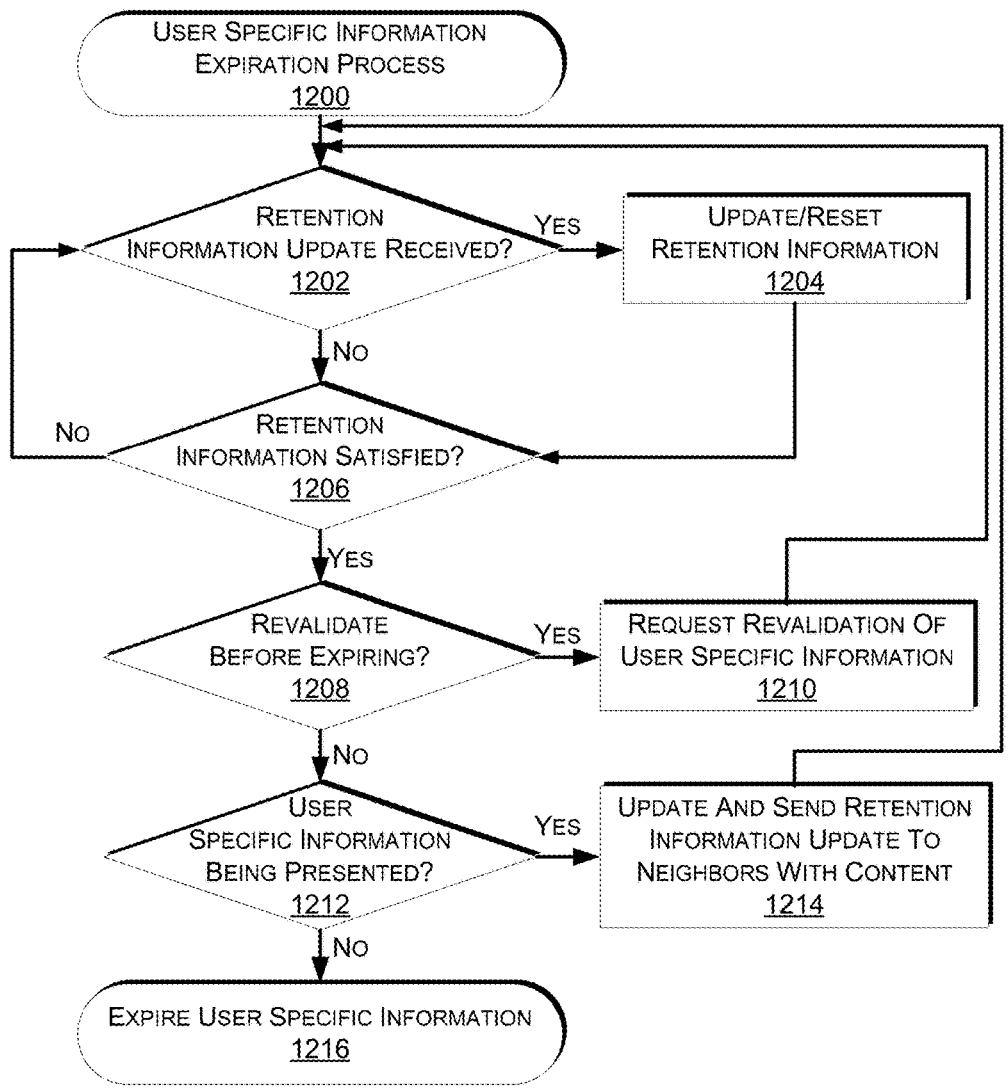
FIG. 12 is a flow diagram of an example user specific information expiration process, according to some implementations.

FIG. 12 is a flow diagram of an example user specific information expiration process 1200, according to some implementations. The example process 1200 begins by determining whether a retention information update has been received, as in 1202. If it is determined that a retention information update has been received, the retention information, such as a delay timer, is updated based on the received retention information update, as in 1204. After updating the retention information, or if it is determined that a retention information update has not been received, a determination is made as to whether the retention information has been satisfied, as in 1206. For example, if the retention information includes a delay timer, the example process may determine whether the amount of time specified by the delay timer has elapsed, thereby satisfying the delay timer. To illustrate, if the user specific information was received by an output device controller and the retention information specifies a delay timer of 30 seconds, it will be determined that the retention information has been satisfied if the output device controller has maintained the user specific information for 30 seconds or more.

If it is determined that the retention information has not been satisfied, the example process 1200 returns to block 1202 and continues. If it is determined that the retention information has been satisfied, a determination is made as to whether the user specific information is to be revalidated before it is expired, as in 1208. As discussed above, the retention information may specify whether the user specific information is to be revalidated upon expiration of a delay timer or time duration. If it is determined that the user specific information is to be revalidated before expiration, a request for revalidation of the user specific information is sent, as in 1210. In some implementations, the revalidation request may be sent to the inventory management system. In other implementations, the revalidation request may be sent to the output device and/or output device controller from which the user specific information was received. For example, as discussed, the inventory management system may provide the user specific information for a first output device controller and that output device controller may propagate the user specific information to other output device controllers. In such an example, the receiving output device controllers may send a revalidation request to the first output device controller. The first output device controller may determine whether to revalidate the user specific information and/or receive revalidation information from the inventory management system. The revalidation information may include a retention information update. For example, if the first output device controller is presenting the user specific information on an output device to a user, it may determine that the user specific information is to be revalidated and not expired.

After sending a revalidation request, the example process 1200 returns to decision block 1202 and continues. If it is determined that the user specific information is not be revalidated before it is expired, it may be determined whether the user specific information is currently being presented on an output device, as in 1212. If it is determined that the user specific information is currently being displayed the retention information may be automatically updated to reset the delay timer and not expire the user specific information, as in 1214. Likewise, a retention information update may also be generated and sent to other output devices and/or output device controllers instructing an update to the retention information corresponding to the user specific information, as in 1214.

If it is determined that the user specific information is not being presented, the user specific information is expired, as in 1216. User specific information may be expired by removing the user specific information from memory, marking the user specific information as expired or invalid, etc. In some implementations, the expired user specific information may be retained in memory until or unless the memory is needed to store other information.

Figure 13:
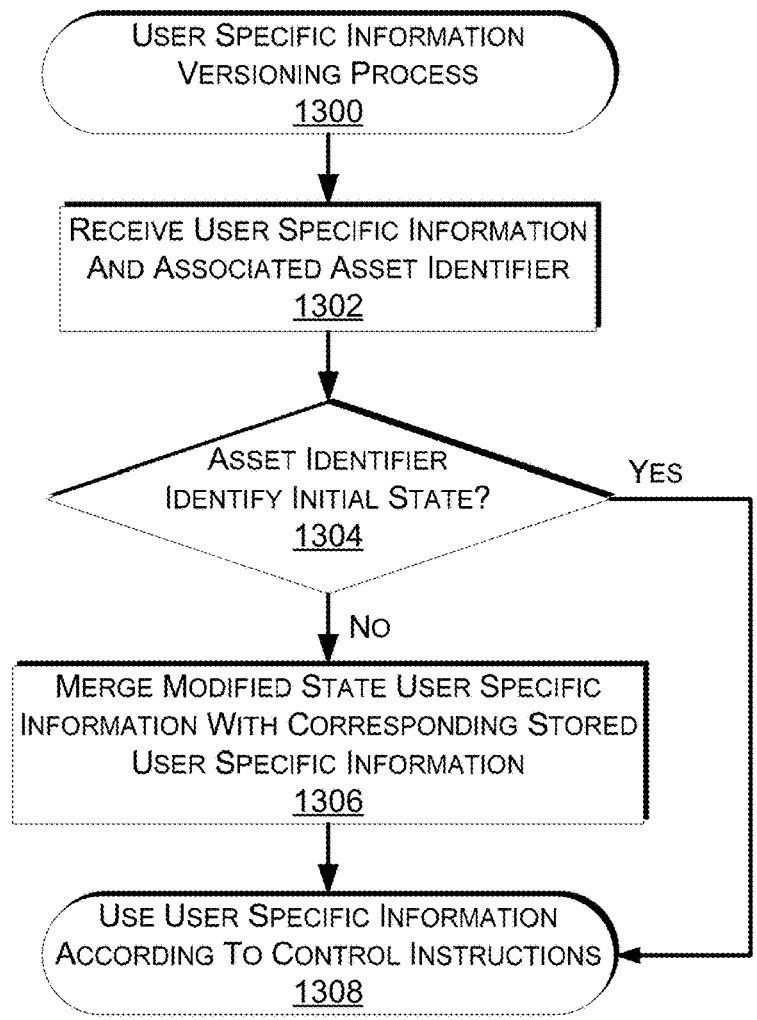
FIG. 13 is a flow diagram of an example user specific information versioning process, according to some implementations.

FIG. 13 is a flow diagram of an example user specific information versioning process 1300, according to some implementations. The example process 1300 begins by receiving user specific information and an associated asset identifier, as in 1302. As discussed above, an asset identifier may be unique to the user specific information and may identify a version or state of the user specific information. While this example discusses the use of an asset identifier to determine a version of the user specific information, it will be appreciated that other techniques may likewise be used to determine the version of the user specific information. For example, a time stamp identifying a time at which the user specific information was generated may be utilized to determine a version of the user specific information.

Based on the received information, a determination is made as to whether the user specific information is an initial state or an initial version, as in 1304. If it is determined that the received user specific information is an initial version, the user specific information is utilized according to the received control instructions, as in 1308. For example, the user specific information may be stored in a memory, rendered and pre-cached, rendered and presented on an output device, etc.

However, if it is determined that the user specific information is not an initial version, the received user specific information may be associated with a previously stored initial version of the user specific information and merged to generate a current version of the user specific information, as in 1306. For example, in some implementations, user specific information may be updated rather than replaced. For example, the user specific information may include a representation of a pick list for a user and the pick list may be updated to add and/or remove items to be picked. Rather than sending a complete replacement of the user specific information, a difference (or delta) between an initial version and a current version may be determined and only the difference provided as the updated version. The receiving output device and/or output device controller will receive the updated user specific information and combine it with the initial version of the user specific information to generate the current version of the user specific information.

In another example, user specific information have multiple states, such as different positions of an object moving (e.g., person walking). Rather than providing a full version of each state of the user specific information, an initial state of the user specific information may include the portion of the representation that is common or the same in all states. Each version may include the portions of the representation that are different for each different state of the object. The receiving output device and/or output device controller may then combine the initial version with each of the different versions to reproduce the different states of the object as needed. By utilizing an initial version and just the difference between the initial version and future versions, the amount of information transmitted through the network is reduced.

After merging the received user specific information and the stored initial user specific information, the merged user specific information is utilized according to the received control instructions, as in 1308.

In still another implementation, user specific information may be modified by different devices. For example, two different output device controllers may modify the same item of user specific information. In such an implementation, if the modified versions of the initial user specific information are provided to another device they may conflict. To resolve, the initial state of the user specific information may be determined by the receiving device (e.g., based on the asset identifier). The modifications made by each output device controller may then be determined and merged into a single updated user specific information. Such a merge will result in the two different changes being combined into a single updated user specific information.

Figure 14:
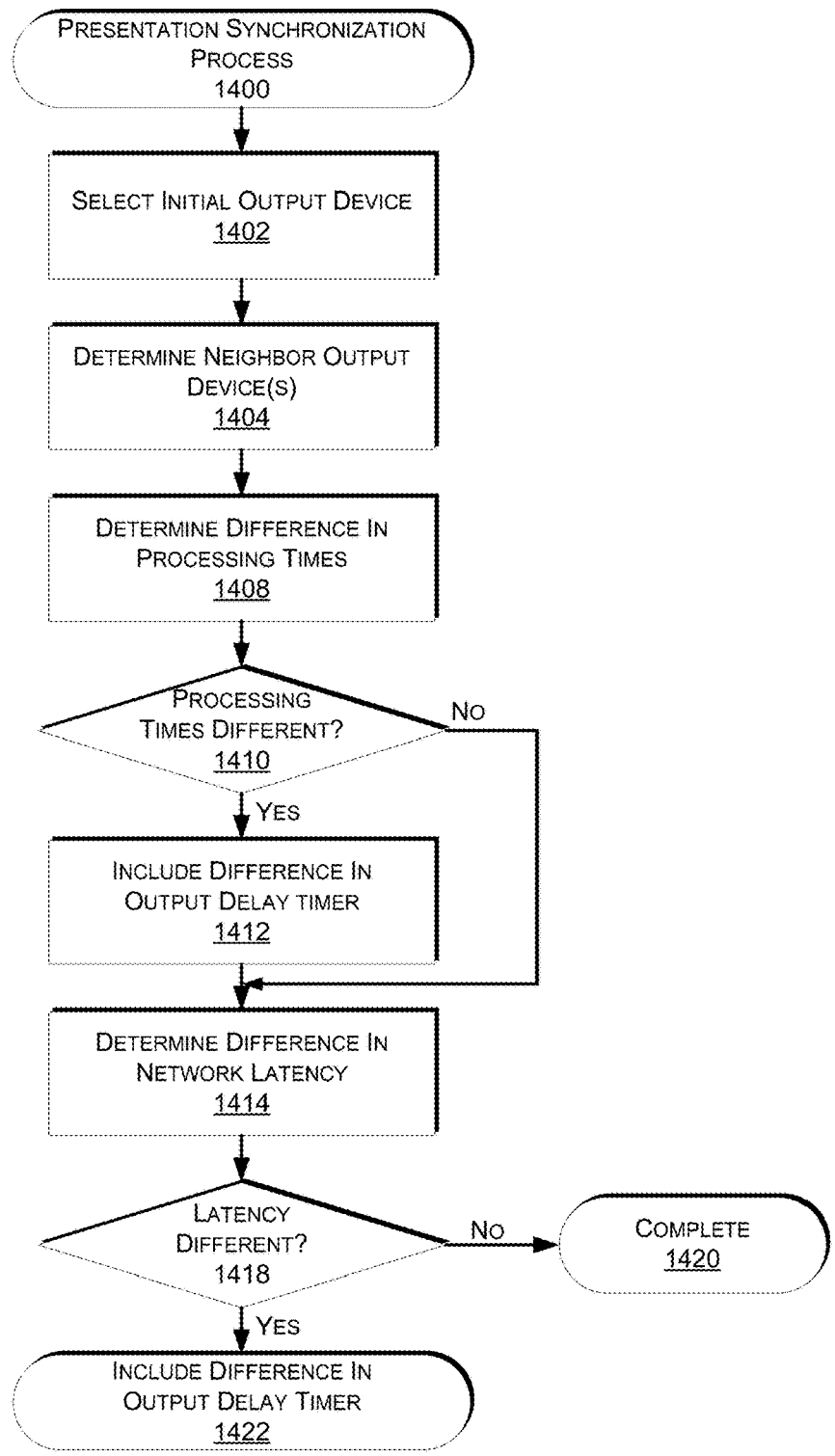
FIG. 14 is a flow diagram of an example process for synchronizing the presentation of content across multiple output devices, according to some implementation.

FIG. 14 is a flow diagram of an example process 1400 for synchronizing the presentation of content across multiple output devices, according to some implementations. As noted above, in instances where user specific information is transitioning between output devices, such as animated user specific information, it may be necessary to delay processing and/or presentation on one or more of the output devices such that the presented information is synchronized and transitions properly. The example process 1400 begins by selecting an initial output device upon which the user specific information may be presented, as in 1402. Likewise, one or more neighbor output devices adjacent to the initial output device are determined, as in 1404. As discussed above, a neighbor output device may be an adjacent device, a device above, below, across from or behind the initial output device. In some instances, the neighbor device may be physically separated from the initial output device. For example, if the initial output device is at the end of an aisle, the neighbor output device may be on a shelf at the beginning of the next aisle.

Once the neighbor output device(s) has been selected, a difference in presentation processing time for each may be determined, as in 1408. For example, the time required for each output device controller to process and initiate projection of user specific information may be maintained and/or determined for each output device controller configured to control the initial output device and the neighbor output device(s). A determination may then be made as to whether the processing time between the initial output device and the neighbor output device are different, as in 1410. If it is determined that the processing times are different, the determined difference is included in an output delay timer, as in 1412. For example, if two neighbor output device controllers have different processing times, the example process 1400 may determine the difference between the processing times and set that difference as the output delay timer. However, if the processing time for both output device controllers is the same, or after including the difference in the output delay timer, a difference between the network latency for each respective output device controller is determined, as in 1414. Other factors, such as clock differences between output device controllers, refresh rates, etc., may also be considered and included as a difference in the delay timer. For example, the output device controller configured to control the initial output device, may have higher or lower network latency than the output device controller configured to control the neighbor output device controller.

If it is determined at decision block 1418 that the network latency is different, the determined difference is included in the output delay timer, as in 1422. If there is no difference in the network latency, the example process 1400 completes, as in 1420.

Figure 15:
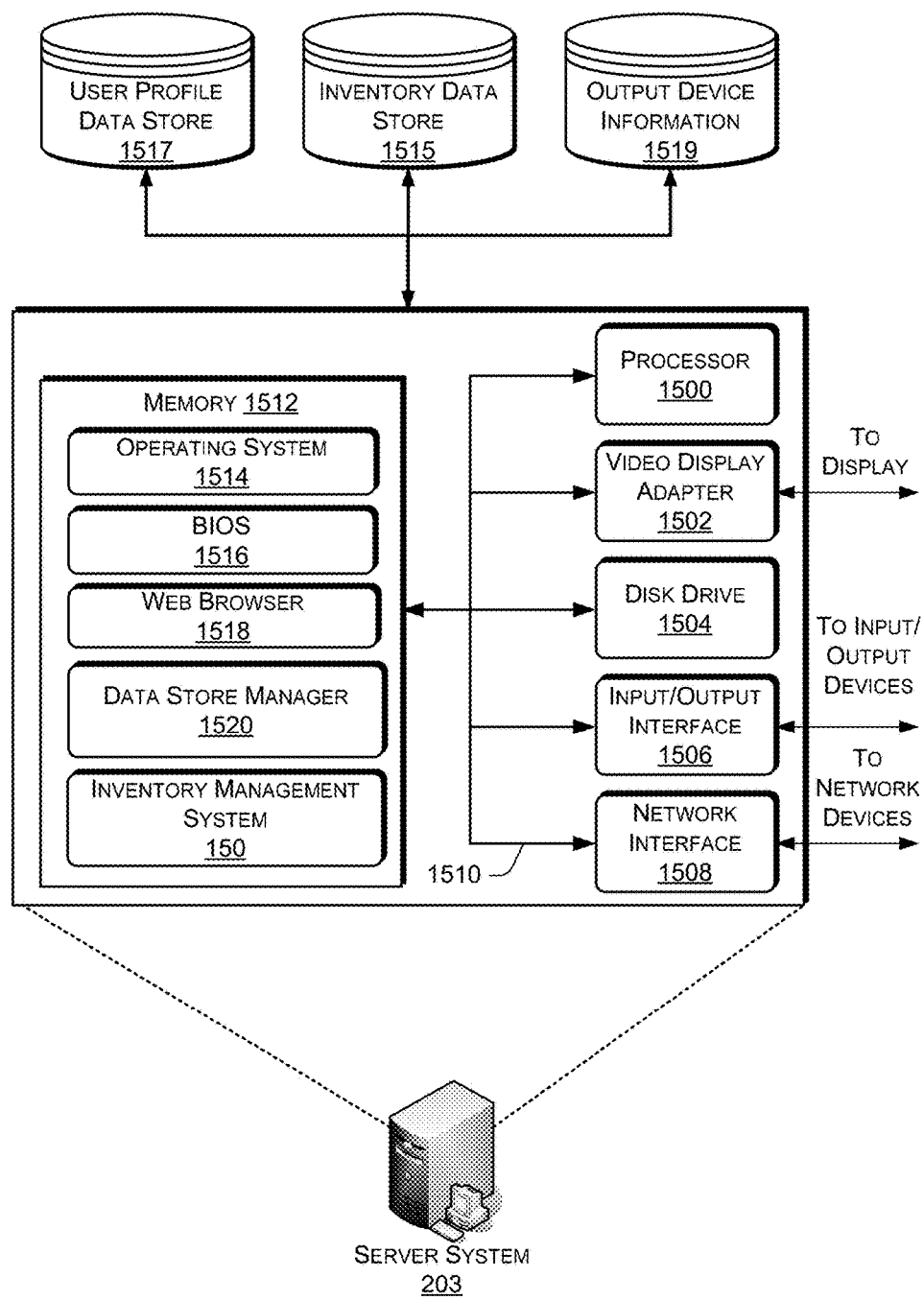
FIG. 15 is a block diagram of an illustrative implementation of a server system that may be used with various implementations.

FIG. 15 is a pictorial diagram of an illustrative implementation of a server system, such as the server system 203 that may be used in the implementations described herein. The server system 203 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and the memory 1512 may be communicatively coupled to each other by a communication bus 1510.

The video display adapter 1502 provides display signals to a local display (not shown in FIG. 15) permitting an operator of the server system 203 to monitor and configure operation of the server system 203. The input/output interface 1506 likewise communicates with external input/output devices not shown in FIG. 15, such as a mouse, keyboard, scanner, or other input and output devices that can be operated by an operator of the server system 203. The network interface 1508 includes hardware, software, or any combination thereof, to communicate with other computing devices. For example, the network interface 1508 may be configured to provide communications between the server system 203 and other computing devices via the network 202, as shown in FIG. 2 and FIG. 3.

The memory 1512 generally comprises random access memory (RAM), read-only memory (ROM), flash memory, and/or other volatile or permanent memory. The memory 1512 is shown storing an operating system 1514 for controlling the operation of the server system 203. A binary input/output system (BIOS) 1516 for controlling the low-level operation of the server system 203 is also stored in the memory 1512.

The memory 1512 additionally stores program code and data for providing network services that allow the inventory management system 150 to identify users and/or items within the materials handling facility. Accordingly, the memory 1512 may store a browser application 1518. The browser application 1518 comprises computer executable instructions, that, when executed by the processor 1500, generate or otherwise obtain configurable markup documents such as Web pages. The browser application 1518 communicates with a data store manager application 1520 to facilitate data exchange between the inventory data store 1515, the user profile data store 1517 and/or the output device information data store 1519.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 1515, 1517, 1519 as needed to execute aspects of the inventory management system 150.

The data stores 1515, 1517, 1519 can include several separate data tables, databases or other data storage mechanisms and media for storing data relating to a particular aspect. For example, the data stores 1515, 1517, 1519 illustrated include mechanisms for inventory information, user profile information, output device information, output device controller information, etc., which can be used to identify users or develop user paths for users, develop user specific information, locate output devices, etc.

It should be understood that there can be many other aspects that may be stored in the data stores 1515, 1517, 1519. The data stores 1515, 1517, 1519 are operable, through logic associated therewith, to receive instructions from the server system 203 and obtain, update or otherwise process data in response thereto.

The memory 1512 may also include the inventory management system 150, discussed above. The inventory management system 150 may be executable by the processor 1500 to implement one or more of the functions of the server system 203. In one implementation, the inventory management system 150 may represent instructions embodied in one or more software programs stored in the memory 1512. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for presenting user specific information, comprising:

under control of one or more computing systems configured with executable instructions, receiving at an output device controller, user specific information, control instructions and retention information, wherein the retention information indicates to the output device controller a time duration after which the user specific information is to be expired;

determining by the output device controller and based at least in part on the control instructions whether to perform one or more of: render and display on an output device controlled by the output device controller the user specific information, render the user specific information and pre-cache the rendered user specific information in a memory of the output device, or store the user specific information in a memory of the output device;

determining by the output device controller that the time duration has been satisfied;
determining by the output device controller that the user specific information is to be revalidated before it is expired;
sending from the output device controller a request for a revalidation of the user specific information;
receiving at the output device controller a response to the request indicating to the output device controller that the user specific information is not revalidated; and
expiring by the output device controller the user specific information, wherein expiring the user specific information includes at least one of removing the user specific information from the memory of the output device or marking the user specific information as invalid.

2. The computer-implemented method of claim 1, further comprising:
determining by the output device controller that the user specific information is currently being presented on a display of the output device;
resetting by the output device controller the time duration by at least one of: resetting a countdown timer or restarting a clock; and
sending by the output device controller and to a second output device controller, a retention information update to reset a second time duration maintained by the second output device.

3. The computer-implemented method of claim 1, further comprising:
receiving at the output device controller an update to the retention information; and
prior to determining that the time duration has expired, resetting at the output device controller the time duration based on the received update to the retention information.

4. The computer-implemented method of claim 1, wherein the retention information further indicates to the output device controller whether a request for revalidation of the user specific information is to be sent before the user specific information is expired.

5. A system, comprising:
a first output device located within a materials handling facility;
a first output device controller connected to and controlling the first output device, the first output device controller including:
one or more processors; and
a memory coupled to the one or more processors and storing program instructions that when executed by the one or more processors cause the one or more processors to at least:
receive user specific information, control instructions, and retention information, wherein:
the user specific information includes information that may be rendered by the first output device controller and presented to a user with the first output device;
the retention information indicates to the first output device controller a time duration after which the user specific information is to be expired by the first output device controller; and
the control instructions indicate to the first output device controller whether the user specific information is to be one or more of: rendered and displayed on the first output device associated with the first output device controller, rendered and pre-cached in a memory of the first output device, or stored in the memory of the first output device controller;
determine by the output device controller that the time duration has been satisfied;
determine by the output device controller that the user specific information is to be revalidated before it is expired;
send from the output device controller a request for a revalidation of the user specific information;
receive at the output device controller a response to the request indicating to the output device controller that the user specific information is not revalidated; and
expire by the output device controller the user specific information, wherein expiring the user specific information includes at least one of removing the user specific information from the memory of the output device or marking the user specific information as invalid.

6. The system of claim 5, wherein the program instructions that when executed by the one or more processors further cause the one or more processors to at least:
determine a version of the user specific information; and
wherein the at least a portion of the user specific information is combined by the first output device controller with at least a portion of a prior version of the user specific information based at least in part on the determined version of the user specific information.

7. The system of claim 6, wherein the version of the user specific information is determined by the first output device controller based at least in part on an asset identifier associated with the user specific information.

8. The system of claim 6, wherein the user specific information includes additional information to be added to the prior version when the prior version and the user specific information are combined.

9. The system of claim 6, wherein:
the prior version of the user specific information is an initial version of the user specific information; and
wherein:
the user specific information is one of a plurality of versions of user specific information; and
each of the plurality of versions, when combined by the first output device controller with the initial version, provide a respective animation state of the user specific information.

10. The system of claim 9, wherein the program instructions that when executed by the one or more processors further cause the one or more processors to at least:
present on the first output device each respective animation state of the user specific information in a defined order to provide an animation of a representation of the user specific information.

11. The system of claim 5, wherein the program instructions that when executed by the one or more processors further cause the one or more processors to at least:
receive at the first output device controller propagation information, wherein the propagation information indicates to the first output device controller whether the first output device controller is to propagate the user specific information to a second output device controller.

12. The system of claim 11, wherein the program instructions that when executed by the one or more processors further cause the one or more processors to at least:

transmit the user specific information to the second output device controller based at least in part on the propagation information.

13. The system of claim 11, further comprising:
a second output device controller including one or more processors and storing program instructions that when executed by the one or more processors cause the one or more processors to at least:
receive the propagation information; and
determine, based at least in part on the propagation information, whether to send the user specific information to a third output device controller.

14. The system of claim 11, wherein the program instructions that when executed by the one or more processors further cause the one or more processors to at least:
transmit the control instructions to the second output device controller, wherein the control instructions further specify for the second output device controller whether the user specific information is to be rendered and displayed on a second output device controlled by the second output device controller, rendered and pre-cached in a second memory of the second output device, or stored in the second memory of the second output device controller.

15. A system, comprising:
a first output device;
an output device controller configured to control the first output device, the output device controller including;
one or more processors; and
a memory coupled to the one or more processors and storing program instructions that when executed by the one or more processors cause the one or more processors to at least:
receive user specific information corresponding to a user located within a materials handling facility;
receive retention information specifying a time duration for retaining the user specific information in the memory;
determine by the output device controller that the time duration has been satisfied;
determine by the output device controller that the user specific information is to be revalidated before it is expired;
send from the output device controller a request for a revalidation of the user specific information;
receive at the output device controller a response to the request indicating to the output device controller that the user specific information is not revalidated; and
expire by the output device controller the user specific information, wherein expiring the user specific information includes at least one of removing the user specific information from a memory of the output device or marking the user specific information as invalid.

16. The system of claim 15, wherein the user specific information and the retention information are provided to a second output device controller based at least in part on a location of a user within the materials handling facility.

17. The system of claim 16, wherein the output device controller provides a retention information update to the second output device controller based at least in part on the location of the user within the materials handling facility.

18. The system of claim 16, wherein the program instructions that when executed by the one or more processors further cause the one or more processors to at least:
determine that the user is positioned near an output device associated with the output device controller; and
send a retention information update to the second output device controller to reset the time duration for retaining the user specific information.

19. The system of claim 16, wherein the location of the user within the materials handling facility is determined by at least one of the output device controller or an inventory management system.

20. The system of claim 15, wherein the time duration is determined based at least in part on a type of the user specific information.

* * * * *